United States Patent
Murakowski

(10) Patent No.: US 11,005,178 B2
(45) Date of Patent: May 11, 2021

(54) ANTENNA AND ANTENNA ARRAY CONFIGURATIONS, ANTENNA SYSTEMS AND RELATED METHODS OF OPERATION

(71) Applicant: Phase Sensitive Innovations, Inc., Newark, DE (US)

(72) Inventor: Janusz Murakowski, Bear, DE (US)

(73) Assignee: Phase Sensitive Innovations, Inc., Newark, DE (US)

(*) Notice: Subject to any disclaimer, the term of this patent is extended or adjusted under 35 U.S.C. 154(b) by 33 days.

(21) Appl. No.: 16/198,652

(22) Filed: Nov. 21, 2018

(65) Prior Publication Data
US 2019/0157757 A1    May 23, 2019

Related U.S. Application Data

(60) Provisional application No. 62/589,542, filed on Nov. 21, 2017, provisional application No. 62/589,544,
(Continued)

(51) Int. Cl.
*H01Q 3/26*    (2006.01)
*H04B 10/548*  (2013.01)
(Continued)

(52) U.S. Cl.
CPC ....... *H01Q 3/2676* (2013.01); *H01Q 21/0025* (2013.01); *H04B 10/00* (2013.01); *H04B 10/548* (2013.01); *H04B 2210/006* (2013.01)

(58) Field of Classification Search
CPC ....... G03F 7/0005; G03F 7/16; H01Q 1/2283; H01Q 1/38; H01Q 21/062; H01Q 21/065;
(Continued)

(56) References Cited

U.S. PATENT DOCUMENTS 5,274,381 A   12/1993 Riza
5,977,911 A * 11/1999 Green ............... H01Q 3/22
                                                342/157
(Continued)

FOREIGN PATENT DOCUMENTS

EP    2363729 A1    9/2011

OTHER PUBLICATIONS

Schneider et al; Radiofrequency signal generation system with over seven octaves of continuous tuning; Jan. 2013; Nature Photonics; pp. 118-122 (Year: 2013).*

(Continued)

*Primary Examiner* — Amritbir K Sandhu
(74) *Attorney, Agent, or Firm* — Muir Patent Law, PLLC

(57) ABSTRACT

The subject matter described herein relates to various antenna element configurations, antenna array configurations, their operations including various systems and methods to generate modulated data for transmission by an RF antenna array via an optical processing engine. The subject matter includes optical processing engine structure and methods (e.g., modulating in the optical domain, MIMO and spatial modulation via RF beam formation, coherent transmission of RF signal components, coherent operation of spatially separate RF antenna arrays) that may be implemented with the various RF antenna array structures. In some examples, the system combines the virtues of digital, analog and optical processing to arrive at a solution for scalable, non-blocking, simultaneous transmission to multiple UE-s. Much of the system architecture is independent of the RF carrier frequency, and different frequency bands can be accessed easily and rapidly by tuning the optical source (TOPS). In some examples, multiple communication channels may be transmitted simultaneously to different
(Continued)

locations. The transmitter may be formed by an array of optically fed antennas.

20 Claims, 24 Drawing Sheets

Related U.S. Application Data filed on Nov. 21, 2017, provisional application No. 62/590,066, filed on Nov. 22, 2017.

(51) Int. Cl.
*H01Q 21/00* (2006.01)
*H04B 10/00* (2013.01)

(58) Field of Classification Search
CPC ............ H01Q 3/2676; H01Q 21/0025; H01Q 21/0075; H01Q 21/20; H04B 10/00; H04B 10/2575; H04B 10/548; H04B 10/803; H04B 2210/006
USPC ............................ 398/43, 182, 183; 342/361
See application file for complete search history.

(56) References Cited

U.S. PATENT DOCUMENTS

| | | | |
|---|---|---|---|
| 6,204,947 B1 | 3/2001 | Page | |
| 6,320,539 B1* | 11/2001 | Matthews | H01Q 3/2676 342/375 |
| 6,337,660 B1* | 1/2002 | Esman | H01Q 3/2676 342/375 |
| 6,891,149 B1* | 5/2005 | Lewis | G01J 9/02 250/227.14 |
| 7,084,811 B1* | 8/2006 | Yap | H01Q 3/2676 342/373 |
| 7,174,100 B1* | 2/2007 | Wachsman | H04J 14/02 398/147 |
| 7,408,507 B1 | 8/2008 | Paek et al. | |
| 7,609,971 B1* | 10/2009 | Zhou | H01Q 25/00 342/375 |
| 8,848,752 B2 | 9/2014 | Prather et al. | |
| 9,250,496 B1 | 2/2016 | Thaniyavarn | |
| 9,525,489 B2 | 12/2016 | Schuetz et al. | |
| 9,614,280 B2 | 4/2017 | Shi et al. | |
| 10,009,098 B2* | 6/2018 | Murakowski | H04B 10/00 |
| 10,312,999 B2* | 6/2019 | Neuman | H04B 7/18515 |
| 10,313,012 B2* | 6/2019 | Murakowski | H04B 10/2575 |
| 10,439,282 B2 | 10/2019 | Murakowski | |
| 10,627,517 B2* | 4/2020 | Yaacobi | G02F 1/292 |
| 2004/0208642 A1* | 10/2004 | Chen | H04B 10/5055 398/186 |
| 2005/0057431 A1 | 3/2005 | Brown | |
| 2005/0213444 A1 | 9/2005 | Murakami et al. | |
| 2006/0065856 A1 | 3/2006 | Diaz et al. | |
| 2007/0041735 A1 | 2/2007 | Darcie et al. | |
| 2007/0206958 A1* | 9/2007 | Chen | H01Q 3/2676 398/183 |
| 2008/0279564 A1 | 11/2008 | Han et al. | |
| 2009/0027268 A1* | 1/2009 | Coward | H01Q 3/22 342/375 |
| 2009/0168367 A1 | 7/2009 | Fujii | |
| 2010/0231453 A1 | 9/2010 | Shinkai | |
| 2010/0246329 A1 | 9/2010 | Murray et al. | |
| 2011/0170870 A1 | 7/2011 | Boffi et al. | |
| 2012/0019426 A1 | 1/2012 | Galluppi | |
| 2013/0169483 A1 | 7/2013 | Vidal Drummond et al. | |
| 2013/0301664 A1* | 11/2013 | Prather | G02F 2/002 372/28 |
| 2014/0185053 A1 | 7/2014 | Lin et al. | |
| 2014/0231627 A1* | 8/2014 | Wakatsuki | G01J 1/44 250/208.2 |
| 2014/0270783 A1* | 9/2014 | Prather | H04B 10/25752 398/115 |
| 2014/0286648 A1 | 9/2014 | Buelow | |
| 2015/0003565 A1 | 1/2015 | George et al. | |
| 2015/0139253 A1* | 5/2015 | Murakowski | H04B 10/50577 370/542 |
| 2016/0054431 A1* | 2/2016 | Zou | G01S 7/282 342/372 |
| 2017/0207531 A1* | 7/2017 | Murakowski | H01Q 5/22 |
| 2017/0310006 A1* | 10/2017 | Vidal Drummond | H01Q 3/2676 |
| 2018/0198608 A1 | 7/2018 | Nordholt et al. | |
| 2019/0020109 A1* | 1/2019 | Puleri | H01Q 3/2676 |
| 2019/0157757 A1* | 5/2019 | Murakowski | H01Q 21/0075 |
| 2019/0319356 A1* | 10/2019 | Shi | H01Q 21/22 |
| 2020/0007261 A1* | 1/2020 | Zou | H04B 7/0617 |

OTHER PUBLICATIONS

Khan et al ; Carrier generation using a dual-frequency distributed feedback waveguide laser for phased array antenna, 2017' Journal of the European optical society—Rapid publications; pp. 1-16. (Year: 2017).*

N. Shimizu and T. Nagatsuma, "Photodiode-integrated microstrip antenna array for subterahertz radiation," in IEEE Photonics Technology Letters, vol. 18, No. 6, pp. 743-745, Mar. 15, 2006 (Mar. 15, 2006) [retrieved on line Jun. 7, 2017 from URL: http://ieeexplore.ieee.org/stamp/stamp.jsp?tp=&arnumber=1599428&isnumber=33633].

Kejia Li et al., "High-Power Photodiode Integrated With Coplanar Patch Antenna for 60-GHz Applications," IEEE Photonics Technology Letters, vol. 27, No. 6, pp. 650-653, Mar. 15, 2015.

Zhi Li et al., "High-power high-linearity flip-chip bonded modified uni-traveling carrier photodiode," vol. 19, No. 26, Optics Express, Nov. 18, 2011.

Schneider et al., "Radiofrequency signal-generation system with over seven octaves of continuous tuning," Nature Photonics, published online Jan. 20, 2013 (www.nature.com/naturephotonics) pp. 1-5.

* cited by examiner

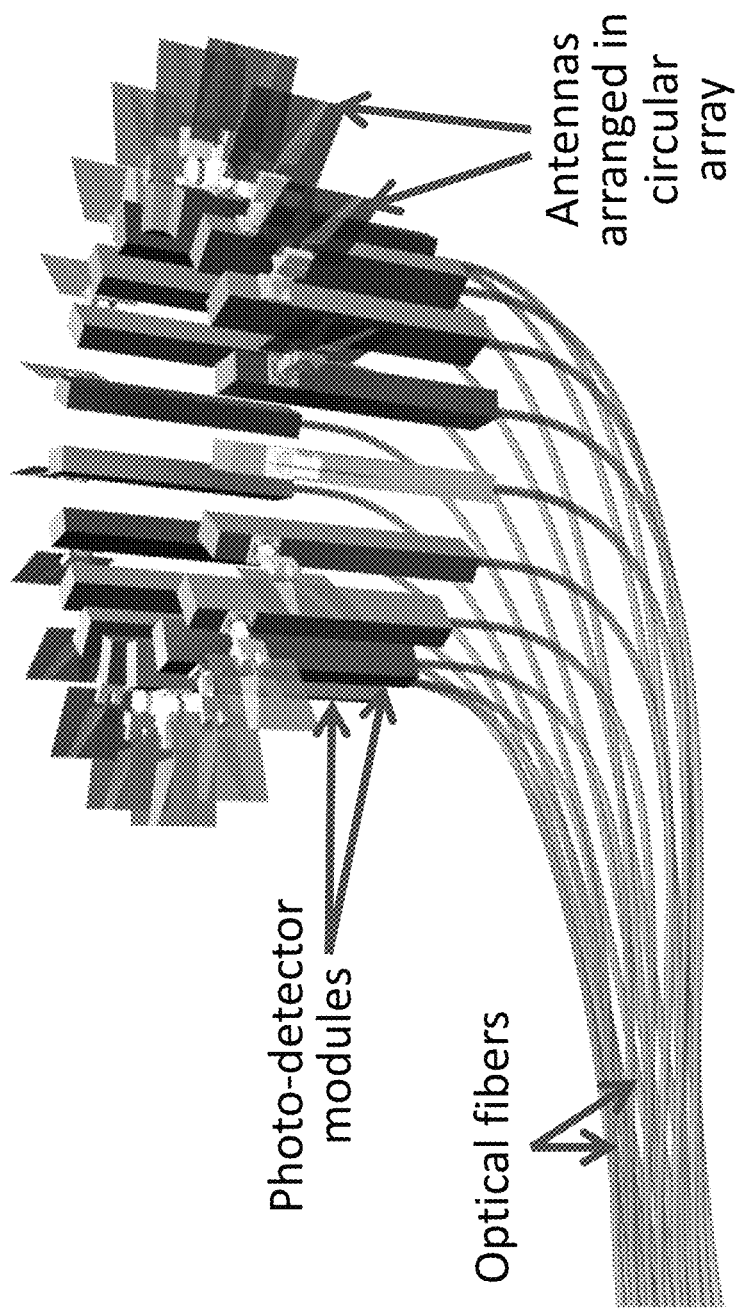

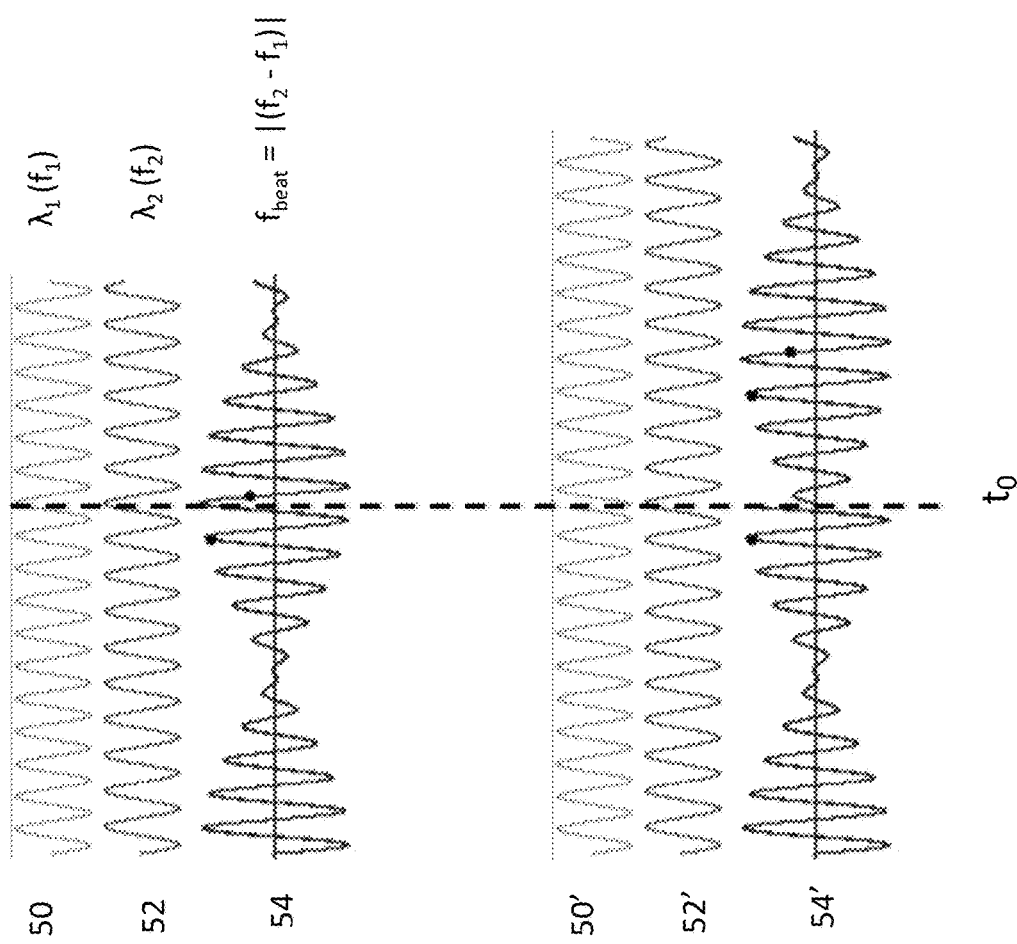

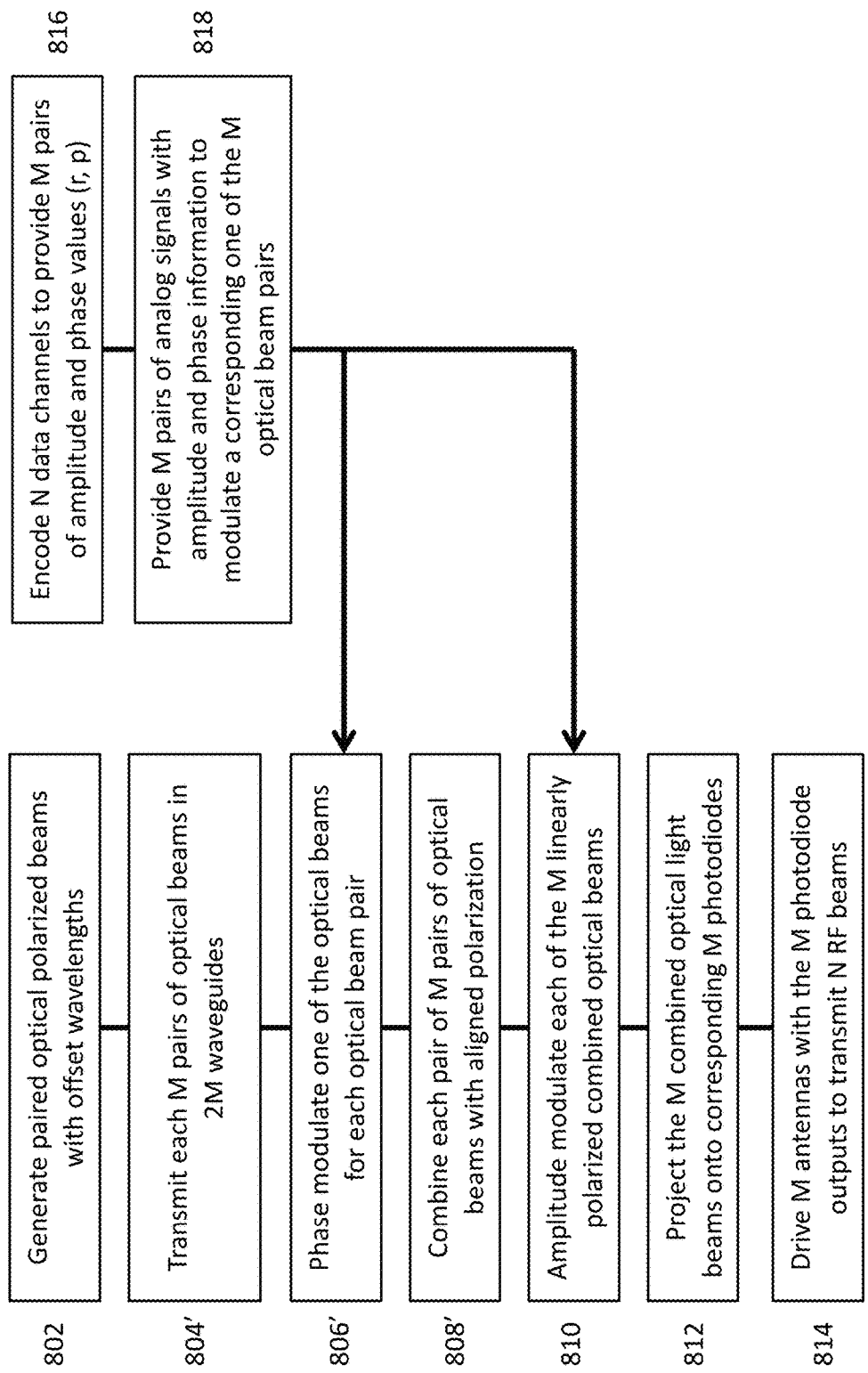

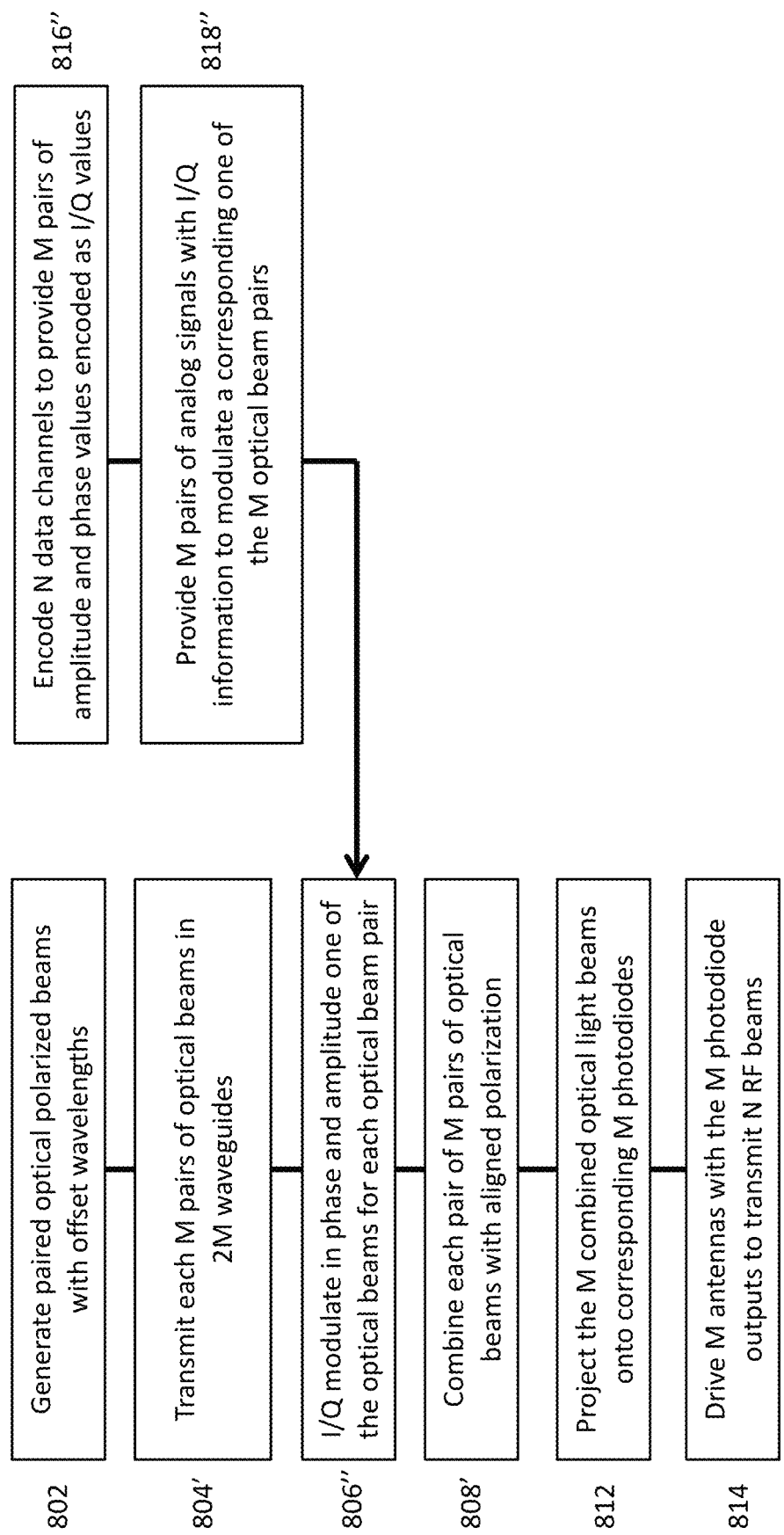

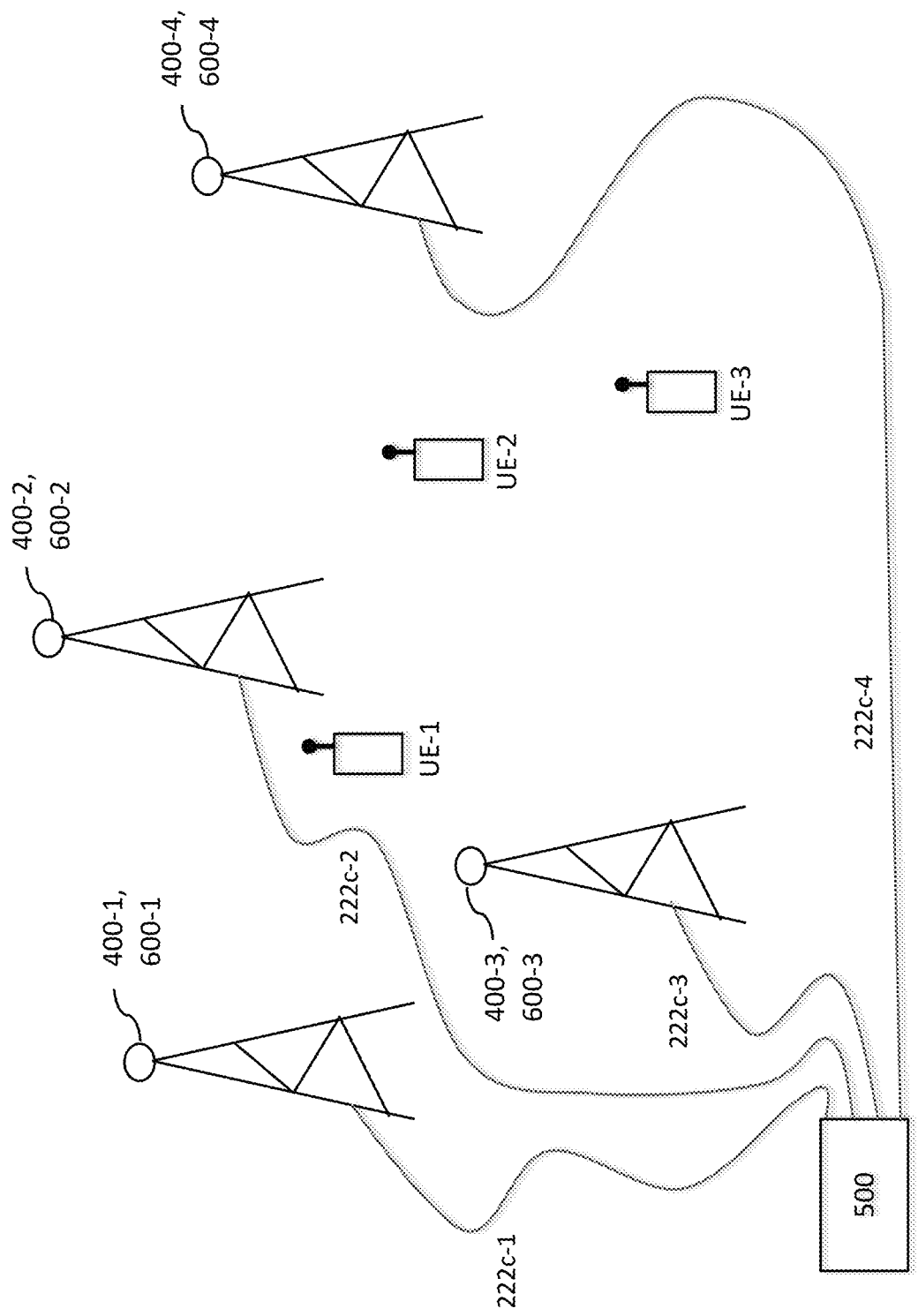

ANTENNA AND ANTENNA ARRAY CONFIGURATIONS, ANTENNA SYSTEMS AND RELATED METHODS OF OPERATION

RELATED APPLICATIONS

This application is a non-provisional application of U.S. provisional application No. 62/590,066 filed Nov. 22, 2017, a non-provisional application of U.S. provisional application No. 62/589,542 filed Nov. 21, 2017 and a non-provisional application of U.S. provisional application No. 62/589,544 filed Nov. 21, 2017, the disclosures of each of which are hereby incorporated in their entirety.

BACKGROUND

Conformal, low profile, and wideband phased arrays have received increasing attention due to their potential to provide multiple functionalities over several octaves of frequency, using shared common apertures for various applications, such as radar and communications.

SUMMARY

In the disclosed optically-fed transmitting phased-array architecture, transmitting signals are converted between the electrical domain and the optical domain by using electro-optic (EO) modulators and photodiodes. RF signals are up-converted into the sidebands of an optical carrier signal. These modulated optical signals can be remotely imparted to photodiodes via optical fibers. Desired RF signals may be recovered by photo-mixing at the photodiodes whose wired RF outputs are and then transmitted to radiating elements of the antennas.

The antenna array may generate a physical RF beam that transmits an RF signal that is focused on, or directed toward, one or more selectable locations. Multiple RF beams may be simultaneously generated, each RF beam being capable of being directed toward a unique location or set of locations.

Multiple antenna arrays may cooperate to coherently combine their respective RF beams to produce hot spots of RF field for improved signal strength and enhanced communication.

BRIEF DESCRIPTION OF THE DRAWINGS

The accompanying drawings are included to provide a further understanding of exemplary device, system and method embodiments of the invention. In the drawings:

FIG. 4C illustrates an alternative arrangement of photodiode driven antennas;

FIG. 5 illustrates exemplary optical waveforms in connection with the relationship between the wavelength offset and the RF frequency antennas of the transmitter antenna array;

FIGS. 8A, 8B and 8C illustrate methods of operation of an antenna transmitter that may be applied to apparatus embodiments described;

FIGS. 11A and 11B show exemplary implementations of a communication system based on configurations of FIGS. 10A to 10E.

DETAILED DESCRIPTION

Figure 1:
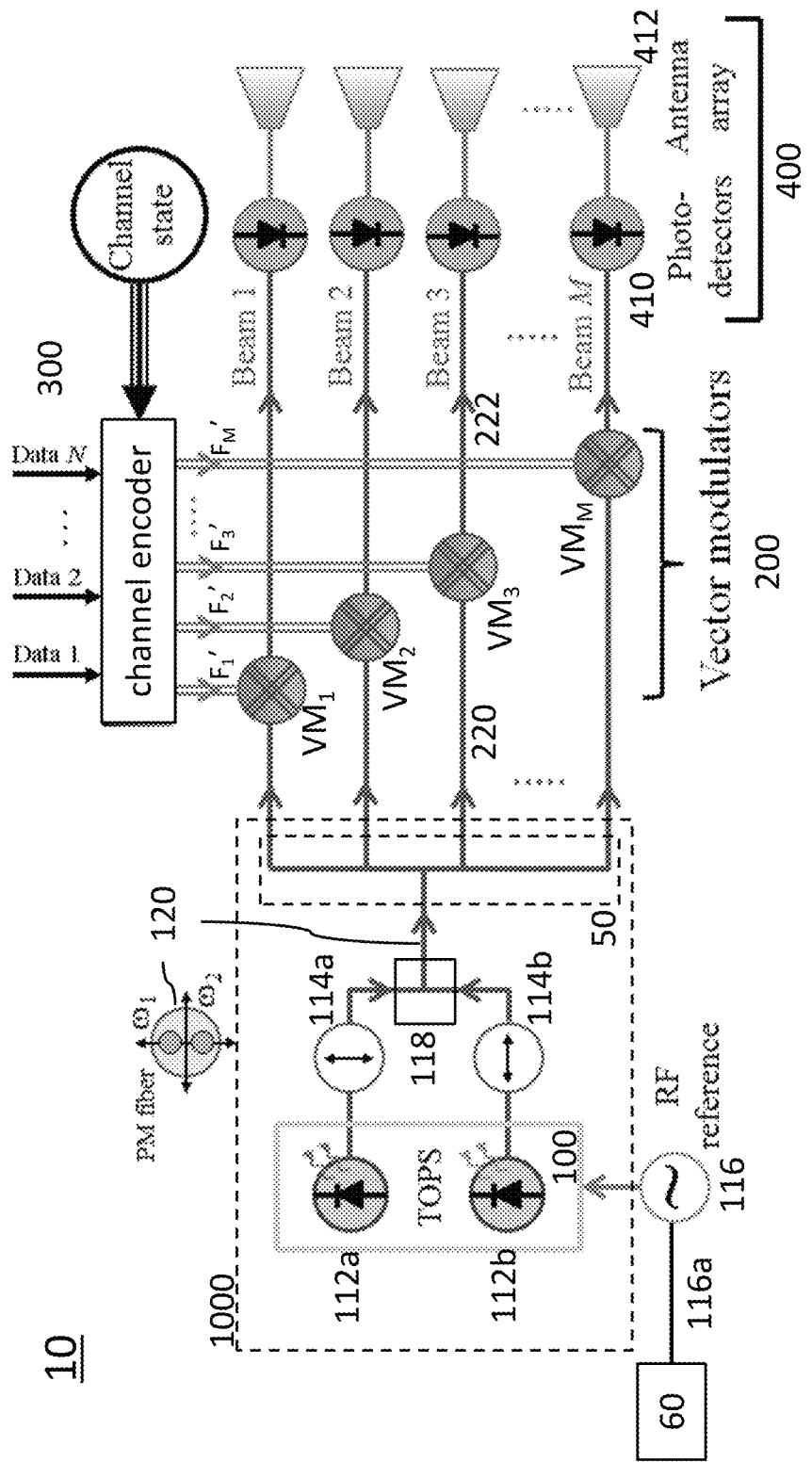
FIG. 1 illustrates one example embodiment of an antenna transmitter.

The present disclosure now will be described more fully hereinafter with reference to the accompanying drawings, in which various exemplary implementations are shown. The invention may, however, be embodied in many different forms and should not be construed as limited to the exemplary implementations set forth herein. These example exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of layers and regions may be exaggerated for clarity. Like numbers refer to like elements throughout. Reference numeral use of lowercase suffix "m" or "n" in this application refers generically to any one of M or N similar elements (although, similar generic references may also avoid use of a "m" or "n" suffix). Though the different figures show variations of exemplary implementations, these figures are not necessarily intended to be mutually exclusive from each other. Rather, as will be seen from the context of the detailed description below, certain features depicted and described in different figures can be combined with other features from other figures to result in various exemplary implementations, when taking the figures and their description as a whole into consideration.

The terminology used herein is for the purpose of describing particular exemplary implementations only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between" versus "directly between," "adjacent" versus "directly adjacent," etc.).

Terms such as "about" or "approximately" or "on the order of" may reflect amounts, sizes, orientations, or layouts that vary only in a small relative manner, and/or in a way that does not significantly alter the operation, functionality, or structure of certain elements.

As used herein, items described as being "electrically connected" are configured such that an electrical signal can be passed from one item to the other. Therefore, an electrically conductive component (e.g., a wire, pad, internal electrical line, etc.) may be physically connected to but not electrically connected to an electrically insulative component (e.g., a polyimide layer of a printed circuit board, an electrically insulative adhesive connecting two devices, an electrically insulative underfill or mold layer, etc.). Moreover, items that are "directly electrically connected," to each other may be electrically connected through one or more connected conductors, such as, for example, wires, pads, internal electrical lines, through vias, etc. As such, directly electrically connected components do not include components electrically connected through active elements, such as transistors or diodes. Directly electrically connected elements may be directly physically connected and directly electrically connected.

FIG. 1 illustrates one example embodiment of an antenna transmitter 10. The RF carrier frequency may be generated optically using a tunable optical paired source (TOPS) 100 where a pair of lasers 112a, 112b each emit a light beam 114a, 114b, where the wavelengths (and frequencies) of the light beams 114a, 114b are offset. The lasers are correlated by injection locking, and the wavelength offset between the light beams 114a, 114b emitted by the lasers 112a, 112b is determined by an RF reference source 116 of the TOPS 100. The RF reference source 116 may be a voltage controlled oscillator that provides an RF reference signal to the TOPS 100. In response to the RF reference signal provided by the RF reference source 116, the TOPS 100 generates light beams 114a, 114b, where the wavelengths of the light beams 114a, 114b are offset so that the difference in frequencies in the light beams 114a, 114b is the frequency of the RF reference signal provided by the RF reference source 116 or its integer multiple. An RF carrier frequency of the antenna transmitter 10 may be the same frequency as the RF reference signal provided by the RF reference source 116 or may be a frequency responsive to this frequency. The RF carrier frequency is thus determined by the RF reference source 116 and is responsive to a voltage 116a that may be adjustable in real time (or for different uses of the antenna transmitter 10) to adjust the corresponding frequency band of the antenna transmitter 10. The voltage 116a input to control frequency of the RF reference signal generated by the RF reference source (and thus the RF carrier frequency of the antenna transmitter 10), may be selectable by a user of the antenna transmitter 10, such as by being generated in response to a programmable controller or other computer configured by software, switches, codes provided by a programmable fuse bank, etc. (such control structure generically represented by control circuit 60 in FIG. 1). Further details of the TOPS operation and structure are disclosed in provisional Application No. 62/289,673 via its detailed description including Schneider et al. "Radiofrequency signal-generation system with over seven octaves of continuous tuning," Nat. Photonics, vol. 7, no. 2, pp. 118-122, February 2013. The contents of provisional Application No. 62/289,673/Schneider et al. are incorporated by reference in their entirety for the teachings of details of structure and operation of TOPS. The optical beams 114a, 114b from the two lasers of TOPS are combined by a conventional optical combiner 118 and input into a single polarization-maintaining (PM) optical fiber 120, each optical beam 114a, 114b being coupled to a different one of the two modes of the PM fiber 120. The distinct modes of a PM fiber 120 differ in polarization are referred to as a 'slow axis' and 'fast axis.' The optical beams 114a and 114b are polarized at angles orthogonal to each other and thus may initially travel independently throughout the PM optical fiber 120 without interference.

From this point, the two optical beams 114a, 114b differing in wavelength travel together and, as a result, the environmental effects such as acoustics, vibration or temperature variation on the relative phase between the beams may be minimized. The RF reference oscillator 116 of the TOPS 100 not only determines the difference in wavelength of the two optical beams 114a, 114b, but acts as a reference for the phase and frequency of a beat frequency resulting from a combined optical beam (to be described further below).

The fiber (and the optical beams 114a, 114b in PM optical fiber 120) is split M ways by a conventional beam splitter 50. In this example, the TOPS 100, the optical combiner 118 and beam splitter 50 form a TOPS module 1000 having M outputs. Each of M branches output by the beam splitter 50 (and the TOPS module 1000) is coupled to a corresponding electro-optic vector modulator $VM_1$, $VM_2$, ... $VM_M$ via an optical fiber 220. The beam splitter 50 may be implemented with a prism, partially reflective mirror, a planar light wave circuit (PLC), a lithium niobate chip that incorporates several modulators, etc., which may allow for omitting optical fiber 220 from the transmitter 10. The input $F'_m$ to each $VM_m$ is provided by the channel encoder 300 and comprises a pair of analog signals Fr and Fp, or an equivalent pair of signals, provided on separate lines to the vector modulator $VM_m$. The pair of signals that carry Fr and Fp respectively carry the desired amplitude and phase of the RF to be output by a corresponding antenna $412_m$ (to which a respective vector modulator $VM_m$ is connected). In the vector modulator $VM_m$, the phase information Fp in encoded into the relative phase offset between the two optical beams 114a, 114b, and the amplitude information Fr is encoded into the amplitude of one or both of the optical beams 114a, 114b.

In addition, the vector modulator $VM_m$ rotates or projects the polarization of one or more of the optical beams 114a, 114b so that the polarization directions of the optical beams 114a, 114b are aligned (discussed further below). As such, the optical beams 114a, 114b may interfere with each other. The output of each vector modulator $VM_m$ is a linearly polarized light containing two spectral lines modulated in relative phase and in amplitude according to the electrical inputs $F'_m$ to the corresponding vector modulator $VM_m$.

The output of each vector modulator $VM_m$ is conveyed by an optical fiber $222_m$ to a corresponding photo-detector $410_m$ coupled directly, or through an RF amplifier, to an antenna $412_m$ of the transmitter antenna array 400. As a result, each of the antennas $412_m$ in the array 400 transmits an RF electromagnetic wave at a frequency determined by or as a function of the wavelength offset in TOPS (the difference in wavelengths between the optical beams 114a, 114b as determined by the TOPS RF reference 116), and modulated in phase and amplitude determined the pair of electrical inputs to the corresponding vector modulator $VM_m$ provided by the channel-encoder 300 in FIG. 1. The channel-encoder 300 in FIG. 1 converts N digital data streams Data 1, Data 2, . . . Data N into M analog vector signals that are fed (as $F'_m$=Fr, Fp) into the electrical inputs of the respective M vector modulators $VM_m$. In this example, each of the digital data streams Data 1, Data 2, . . . Data N corresponds to a channel of the transmitter 10. It should be noted that "channel" as used herein simply refers to a communication channel to convey information, whereas an RF beam or RF wave refers to the electromagnetic waves that form a communication channel. The communication channel may itself be formed of a plurality of discrete communication channels. For example, the communication channel may carry information from multiple data streams (Data n) encoded with conventional encoding techniques, such as TDMA (time division multiple access), OFDM (orthogonal frequency division multiplexing), CDMA (code division multiple access), etc., where several users (several UEs) share the same frequency or frequencies of the communication channel. It should also be appreciated that a single RF beam and its communication channel may be formed instead as two or more RF beams (e.g., with the same complex vector $X_n$—as will be described below) with the multiple RF beams simultaneously transmitted to converge at different locations associated with different UEs.

The conversion process of channel encoder 300 to convert the N digital data streams Data 1, Data 2, . . . Data N into M analog vector signals takes into account channel-state information obtained by the receiver portion of the communication system to direct the RF wave with the encoded information to the targeted user equipment (UE). In general, each of the N communication channels typically will use all of the M antennas to form an RF wave that 'converges' on the UE (or UEs). In the case of a non-scattering (line-of-sight) environment, the channel-encoder 300 performs a (spatial) Fourier transformation on the N data inputs so that the resulting N RF 'beams' or waves point in the directions of the respective UE-s. The Fourier transformation is performed digitally at every cycle of the incoming data, i.e. with the frequency of the symbol rate of the data streams. The (complex) results of the Fourier transformation are converted to analog signals that are fed to the respective vector modulators. As a result, all N data streams are transmitted simultaneously from the M-element antenna array to the corresponding UE-s. The transmission is non-blocking as long as sufficient spatial separation (orthogonality) between channels can be achieved and maintained.

Figure 2:
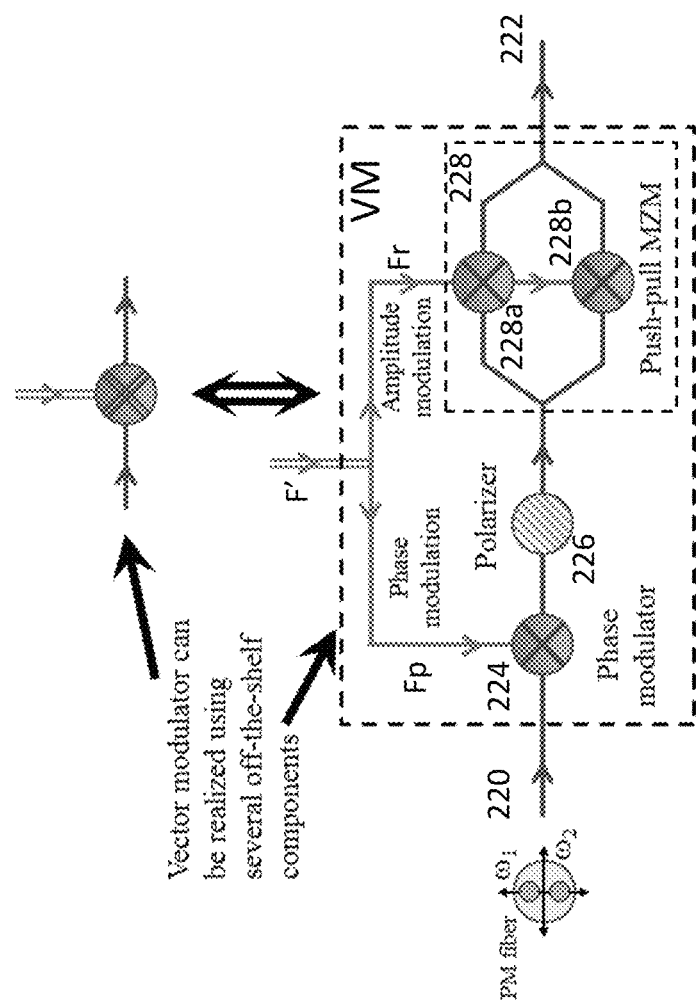
FIG. 2 illustrates an exemplary vector modulator of FIG. 1.

FIG. 2 illustrates an exemplary vector modulator VM. The input $F'_m$ to each VM is provided by the channel encoder 300 and comprises a pair of analog signals Fr and Fp provided on separate lines to the vector modulator VM. The pair of signals that carry Fr and Fp respectively carry the desired amplitude and phase of the RF to be output by a corresponding antenna $412_m$ (to which a respective vector modulator VM is connected). As discussed further below with respect to FIGS. 3A and 3B, the signals Fr and Fp may respectively have the phase information and amplitude information encoded thereon, which may be obtained by a digital to analog conversion of digital values (r, p), and may further have the frequency shifted by mixing with a carrier frequency of the corresponding encoder mixer $EM_m$ (see FIG. 3A). Thus, the carrier frequency of this EM mixer also may operate to shift the frequency of the RF electromagnetic wave output by the antenna $412_m$ connected to receive the modulated light (Beam m) output by the corresponding vector modulator VM. In the vector modulator VM, the phase information Fp is encoded into the relative phase offset between the two optical beams 114a, 114b, and the amplitude information Fr is encoded into the amplitude of one or both of the optical beams 114a, 114b. Whether the amplitude of one or both of the optical beams is modulated may be determined by the architecture of the vector modulator employed. In this exemplary vector modulator, the amplitude of both optical beams 114a and 114b is modulated. When encoding the amplitude information Fr into both optical beams, care should be given to ensure proper scaling of the RF output with the input amplitude modulation signal.

FIG. 5 illustrates the relationship between the wavelength offset between optical beams 114a, 114b and the generation RF frequency of the antenna $412_m$ driven by the combined optical beams 114a, 114b output by the vector modulator $VM_m$. In this example, the uppermost waveform 50 corresponds to a wavelength/frequency of $\lambda_1/f_1$ (e.g., of optical beam 114a), while the middle waveform 52 corresponds to a wavelength/frequency of $\lambda_2/f_2$ (e.g., of optical beam 114b). Traveling on the fast and slow axes of the PM optical fiber 120 with polarization of each optical beam perpendicular to each other, the optical beams 114a and 114b do not interfere with each other. However, after projecting the polarizations of each of these optical beams 114a and 114b onto the same optical axis, e.g. an axis tilted at 45 degrees with respect to the slow and fast axes, the optical beams 114a and 114b start to interfere and create the combined Beam m (labeled as 54 in FIG. 5) having a beat frequency of $|f_2-f_1|$. This beat frequency corresponds to the RF frequency, both in amplitude and phase, of the RF electromagnetic wave output by the corresponding antenna 412m.

The lower waveforms 50', 52' and 54' provide a comparative example to show the effect of phase modulating optical beam 114a by 180 degrees at time $t_0$—as can be appreciated, the resulting waveform in the combined Beam m' (54') is now formed from a destructive interference from waveforms 50' and 52' immediately after time to while the waveform of the combined Beam m 54 results from a continuance of the constructive interference of waveforms 50 and 52. It will be thus appreciated that the phase modulation of the phase of one of the optical beams 114a, 114b by vector modulator VM causes a corresponding phase modulation of the combined Beam m with respect to its beat frequency, and with respect to the RF electromagnetic wave output by the corresponding antenna 412m.

As noted, each of the antennas $412_m$ in the transmitter antenna array 400 transmits an RF electromagnetic wave at a frequency determined by or as a function of the wavelength offset in TOPS (the difference in wavelengths between the optical beams 114a, 114b, as determined by the TOPS 100). The RF electromagnetic wave frequency (antenna operating frequency) may be substantially the same as the inverse of the wavelength offset scaled by the speed of light. For example, if the RF reference 116 has a frequency of 50 GHz, and the frequency of the analog signals Fr and Fp are each 1 GHz (which may be produced from digital to analog conversion of digital values (r, p) using commercially available DACs), the antennas $412_m$ may operate with an RF frequency of substantially equal to 50 GHz (here, 49 GHz and/or 51 GHz). In this example, the combined optical signal Beam m will have beat frequencies of 49 GHz and 51 GHz, both of which may impinge on and drive photodetectors 410 and thus drive antennas 412. The 49 GHz and 51 GHz sidebands result from modulating by vector modulator VM of the optical signals 114a, 114b (that when combined have a 50 GHz beat frequency) with the 1 GHz analog signals Fr, Fp output by channel encoder.

In other examples, the RF electromagnetic wave frequency (antenna operating frequency) may be substantially different from the RF reference 116 frequency, and be a single sideband frequency resulting from the phase modulation and/or amplitude modulation within the vector modulator by analog signals Fr, Fp. For example, if the RF reference 116 has a frequency of 50 GHz, and the frequency of the analog signals Fr and Fp are each 10 GHz, the antennas $412_m$ may operate with a frequency of either the 60 GHz or 40 GHz sidebands. In this case, a filter may be implemented (not shown) to remove one of the sidebands and leave the other sideband remaining. The filter may be an RF filter (not shown) provided between the photodetector $410m$ and the antenna $412m$. The transmission to each of the spatially-separated UE-s can utilize the entire bandwidth available in the frequency band. The instantaneous bandwidth is limited by the speed of digital processing in the channel encoder and by the digital-to-analog converter (DAC) sample rate of the encoder modulators EM. The pointing accuracy of the RF beam is as high as the resolution of the DAC and can reach 16 bits at 2.8 GSPS (giga-samples per second) for commercially available products, such as DAC39J84 manufactured by Texas Instruments (see http://www.ti.com/product/dac39j84 [Accessed: 15 Jan. 2016]).

Figure 6:
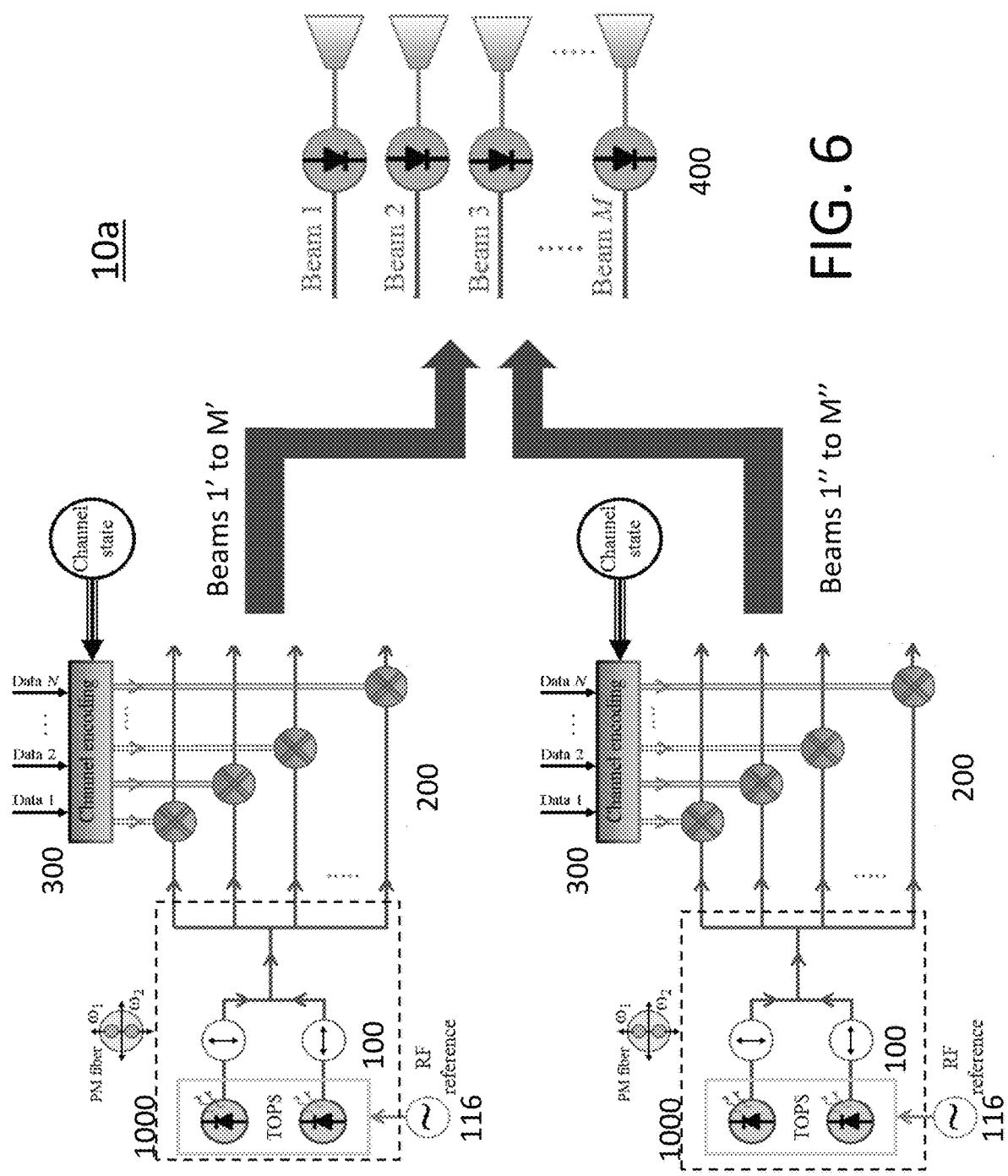
FIG. 6 illustrates an example of a plural-subsystem transmitter that may be formed by duplicating structure of the antenna transmitter described with respect to FIG. 1.

To access different frequency bands beyond the bandwidth of the channel-encoder 300 or the DAC, the TOPS module 1000 (e.g., TOPS 100, optical combiner 18, beam splitter 50 or variations thereof, such as described herein), vector modulator array 200 and channel encoder 300 may be replicated to provide multiple subsystems (each including a TOPS module 1000, vector modulator array 200 and channel encoder 300), each sub-system operating with a different RF carrier frequency (correlating to a different unshifted RF carrier frequency of the sub-system). FIG. 6 illustrates one example of a two-subsystem transmitter 10a (although more than 2 sub-systems may be implemented in such a configuration). The optical beams Beam 1, Beam 2 . . . Beam M generated by the different sub-systems may have different frequencies (either from use of a different RF reference frequency provided to the TOPS module 1000 via a different RF reference 116, or by using different modulation frequencies provided by the channel encoder 300). The optical beams of each sub-system (e.g., Beam m' and Beam m") may be combined at the photo-detectors (so that a Beam m of each sub-system impinges on a corresponding one of the photodetectors $410_m$—either by first combining the corresponding beams (e.g. as shown in FIG. 6) and impinging the resultant combined Beam on corresponding photodetector, or by impinging the beams separately onto the photodetector such that they combine at the photodetector). Isolation between the different bands may be achieved by ensuring that the TOPS modules 1000 operate at wavelength differences separated sufficiently so that the beat frequency of the different TOPS modules 1000 lies outside of the frequency response limit of the photodiodes or is suppressed by the antennas. Although not shown in FIG. 6, the RF reference may have its output RF frequency adjusted as described above with respect to FIG. 1.

Vector Modulator.

The following description provides further details of the exemplary vector modulator VM of FIG. 2. The role of the vector modulator VM is to impart a two-component electrical signal $F'_m$ onto the phase offset and amplitude(s) of the optical beam(s) 114a, 114b traveling as two modes (orthogonal polarizations) in a PM optical fiber 220. In addition, the vector modulator VM projects the two orthogonal polarizations at 45° to output a single linearly-polarized beam on fiber $222m$ that can be directed to a photo-detector $410m$. Such a vector modulator may be realized using off-the-shelf components.

The optical input of the vector modulator VM is a PM fiber 220 carrying optical beams 114a, 114b in both the slow and the fast axis. The electrical input consists of two lines: One carrying phase-modulation signal Fp and the other carrying amplitude-modulation signal Fr. The phase-modulation signal Fp is directed to a phase modulator 224, such as a lithium-niobate modulator manufactured by Phase Sensitive Innovations, Inc. However, other phase modulators may be used. The amplitude-modulation signal Fr is directed to an amplitude modulator 228 such as a Mach-Zehnder push-pull modulator as depicted in FIG. 2. However, other amplitude modulators may be used.

The modulation efficiency ($V_\pi$) of a lithium-niobate modulator is polarization dependent due to different values of the electro-optic coefficients $r_{33}$ and $r_{13}$ in the nonlinear crystal. In lithium niobate, according to DC12_LN (See OptCrys_8/99—LNmatProperties.pdf." [Online] Available: http://www.goochandhousego.com/wp-content/pdfs/LN-matProperties.pdf. [Accessed: 15 Jan. 2016]) $r_{13}=10$ whereas $r_{33}=33$, which means that the mode polarized along the crystalline z-axis, that is largely parallel to applied electric field in a conventional lithium-niobate phase modulator, will undergo a phase shift three times as large as the mode polarized perpendicular to the crystalline z-axis under the effect of externally applied voltage. As a result, phase offset will ensue between the two optical signals 114a, 114b propagated on the two modes entering the modulator VM.

Following the phase modulator 224, the modes are projected in a polarizer 226 onto an axis tilted at 450 with respect to the polarization of the two modes. This mode projection places both of the beams 114a, 114b in the same mode at the cost of 3 dB loss to the optical power. This linearly polarized combined optical beam (Beam 1, Beam 2, . . . [generically referenced as Beam m]) is then directed to an amplitude modulator 228 that receives the amplitude-modulation signal Fr from the electrical input of the vector modulator VM. In FIG. 2, the amplitude modulator 228 takes the configuration of a conventional Mach-Zehnder push-pull arrangement where the input optical beam is first split into two equal parts, the phases in the two parts undergo modulation in opposite directions via modulators 228a, 228b, and the beams are combined into a single output on optical fiber 222. Thus, the phase modulation in the two arms is converted to amplitude modulation of the combined beam.

This way, at the output on fiber 222 of the vector modulator VM illustrated in FIG. 2, the phase offset between the input beams 114a, 114b is modulated according to the phase-modulation signal Fp, whereas the amplitudes of the optical beams are modulated according to the amplitude-modulation signal Fr at the input of the vector modulator VM.

In some examples, the functionality of the vector modulator VM may potentially be achieved using a single component. In this case, attention should be given to coupling and modulation efficiencies in the different polarizations to achieve desired performance.

It is noted that the frequency response of the vector modulator VM need only be as high as the baseband frequency of the electronic signal containing the data. The latter is limited by the presently available digital to analog converters (DAC-s). For example, if using a high speed digital to analog converter, such as DAC39J84 manufactured by Texas Instruments (see http://www.ti.com/product/dac39j84 [Accessed: 15 Jan. 2016]), to its full capacity, a vector modulator with a bandwidth of zero to 1.4 GHz would be adequate. Such frequency of operation may be considered low by the standards of fiber-based telecommunication.

Channel Encoder.

Figure 3A:
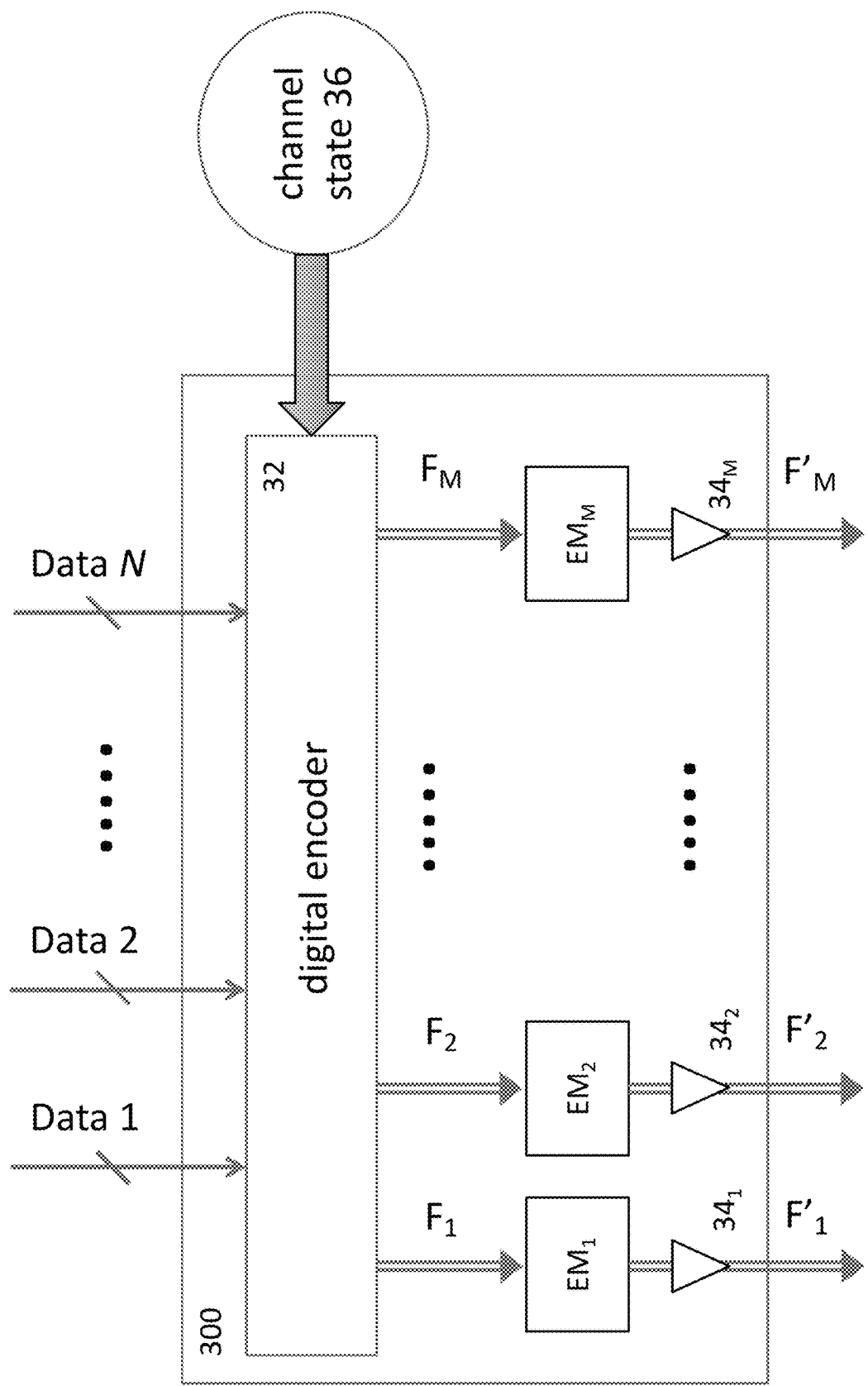
FIG. 3A illustrates exemplary configuration of channel encoder of FIG. 1.

FIG. 3A illustrates exemplary configuration of channel encoder 300. The channel encoder 300 comprises a digital encoder 32 that converts digital data streams Data 1, Data 2, . . . Data N, targeted for different users, or spatial sectors, to phase-and-amplitude profiles that yield one or more RF beams/channels carrying data directed at the respective UE-s. As noted herein, the RF beam may comprise a single physical RF beam, but may also have other forms intended to have the RF energy resulting from the communication channel of RF beam converge on one or more UEs. The digital encoder may comprise a special purpose processor, such as a digital signal processor (DSP), a general purpose microprocessor (MPU), a graphics processor unit (GPU), application-specific integrated circuit (ASIC), field-programmable gate array (FPGA), or other computer configurations, configured to perform transformation of the data streams Data 1, Data 2, . . . Data N into a set of M complex digital numbers $F_1, F_2 \ldots F_M$, where each complex digital number comprises a pair of digital values (a, b) representing the real and imaginary portion of the corresponding digital number $F_m$, or the modulus and argument of said number, or any other suitable representation of the complex digital number.

The complex digital numbers $F_1, F_2 \ldots F_M$ are output by the digital encoder 32 to a corresponding set of encoder modulators $EM_1, EM_2 \ldots EM_M$. Each encoder modulator $EM_m$ converts a corresponding complex digital number $F_m$ to an analog form by digital-to-analog conversion of each of the pair of digital values (r, p) and outputting the modulated signals as a corresponding pair of analog signals $F'_m$ on two separate output lines from each encoder modulator $EM_n$. It should be noted that each of the signals may be a differential signal where the output line associated with each differential signal comprises two separate conductor lines, such as a coaxial cable. As discussed below, optionally signals may further be shifted in frequency by mixing them with a suitable sub-carrier. Thus, each pair of analog signals $F'_m$ represents a corresponding complex digital number $F_m$ in analog form. The set of signal pairs $F'_1, F'_2 \ldots F'_M$ are transmitted to the array of vector modulators 200. As discussed below, optionally signal pair $F'_m$ may be transmitted to a corresponding one of the vector modulators $VM_1$, $VM_2 \ldots VM_M$ of the vector modulator array 200 after having each of its signals amplified by a corresponding amplifier.

Figure 3B:
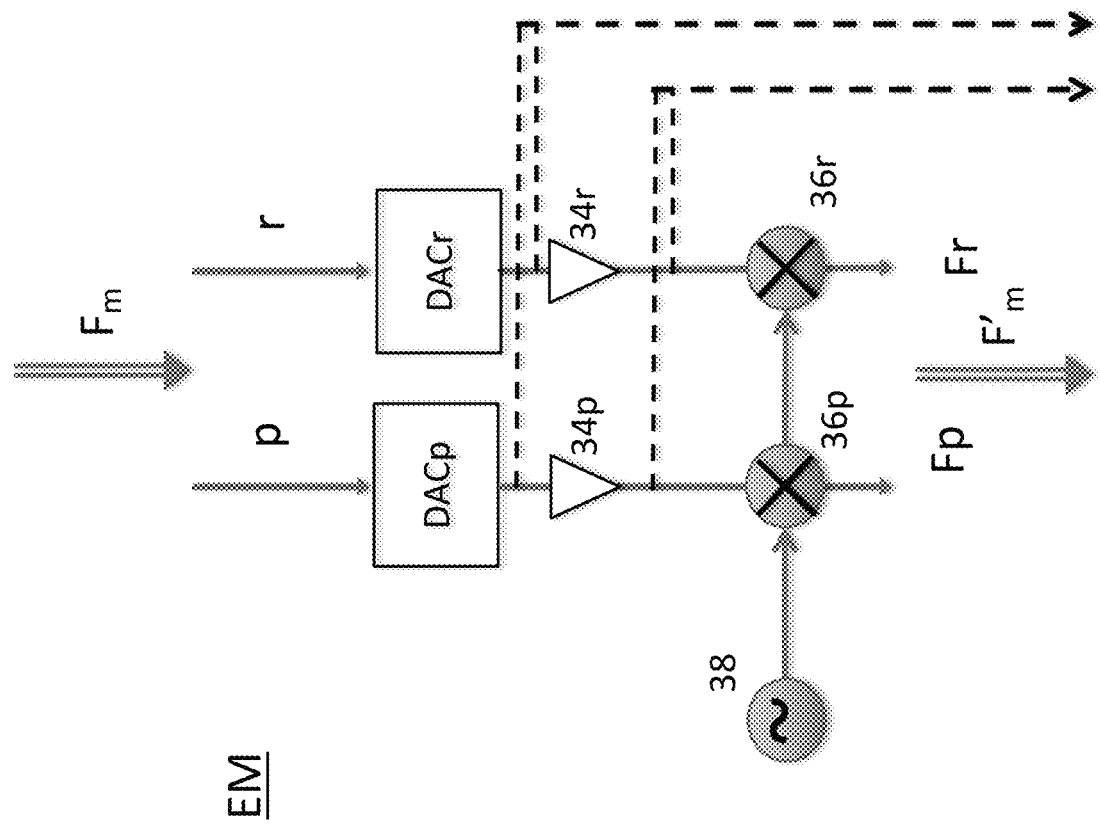
FIG. 3B illustrates an exemplary configuration of an encoder modulator of FIG. 3A.

FIG. 3B illustrates an exemplary configuration of an encoder modulator EM. When the complex digital number $F_m$ is provided by digital encoder 32 in rectangular form (comprising real and imaginary values as (x, jy) Cartesian coordinates), the Cartesian complex digital number may first be converted to its polar form (r, p) (equivalent to the radius r and polar angle $\Theta$, respectively) prior to digital to analog conversion. FIG. 3B illustrates the complex digital value (r, p) in polar form having each of its digital components r and p being converted to analog signals by digital to analog converters DACr and DACp, respectively, and then amplified by amplifiers 34*r* and 34*p*. The analog signals generated by DACr and DACp, respectively, and then amplified by amplifiers 34*r* and 34*p* may have a frequency chosen based on the antenna transmitter operational frequency limited by the operational frequency of the digital to analog converter. Commercially available DAC may generate an analog signal up to and over 1 GHz.

The analog signal outputs of the amplifiers 34*r* and 34*p* may each be respectively upconverted to a higher frequency analog signal Fr and Fp by mixers 36*r* and 36*p*, each being fed a carrier frequency from oscillator 38. It should be appreciated that the carrier frequency here is with respect to the lower frequency analog signals provided by DACr and DACp. The analog signals generated by DACr and DACp may be directly output from DACr and DACp as the analog signal $F'_m$ (comprising component signals Fp and Fr) (i.e., without amplification or further upconversion to a higher frequency) or may be directly output as the analog signal $F'_m$ from amplifiers 34*r* and 34*p* (i.e., without further upconversion), such options being shown by the dashed lines in FIG. 3B. Thus, analog signals Fr and Fp (F'm) may provide phase and amplitude information, either at the frequency determined by the digital to analog converters DACr and DACp or by the carrier frequency provided by oscillator 38.

Channel encoding takes place in digital domain, in the digital encoder 32 of FIG. 3A. Before the encoding can take place, a channel state is determined for each of the N channels. The channel state may be measured by the same aperture that is used to transmit the data. Channel state information may be measured using any known techniques. See, e.g., U.S. Pat. No. 6,473,467 (incorporated by reference for this purpose), discussing several such techniques. The channel state for the channel corresponding to n-th UE is represented by a complex vector $X_n$ whose entries correspond to amplitudes and phases received by the individual antennas of the array in the channel-state measurement step. Since there are M antennas in the array, the channel state is encoded in a 1-by-M array of complex numbers.

Transmitted data are encoded as symbols represented by points in two dimensions. Equivalently, each symbol can be represented as a complex number with the real and imaginary parts corresponding to the two different dimensions. For the n-th data channel, $D_n(t)$, where t is time, will be used to represent the stream of symbols to be sent to n-th channel.

If N different UE-s are found with 'sufficiently' orthogonal channels, i.e. $\langle X_n, X_{n'} \rangle \approx 0$ for all pairs $n \neq n'$, then the following complex vector is formed $$X(t) = \sum_{n=1}^{N} D_n(t) X_n^*, \tag{1}$$

where $X_n$ is a properly normalized version of $X_n$ to account for signal strength variations required for different the UE-s, and the asterisk represent complex conjugation. Vector X(t) has M complex entries, where each entry corresponds the amplitude and phase of the RF wave to be transmitted from each of the M antennas of the array. Entries of the vector X(t) are converted to a format suitable for the respective vector modulator of the MU-MIMO transmitter 10 of FIG. 1. For example, if a vector-modulator architecture FIG. 2 is used, amplitude and phase of the complex numbers are output by the digital encoder 32. The results are then converted to analog domain by encoder modulators EMm and amplified for the use in the vector modulators VMm.

It is noted that according to Eq. (1), the RF beam forming happens at the rate at least as high as the fastest symbol rate to be transmitted to a UE at the receiving end; the optical layer of the MU-MIMO system can easily accommodate tens of GHz. The data are transmitted simultaneously to all UE-s, and the encoding scheme is arbitrary: different UE-s can use different encodings.

For UE-s having channels insufficiently orthogonal, conventional channel separation is used such as the employment of CDMA, OFDM, TDMA, etc. On the other hand, to minimize interference between channels that are imperfectly separated spatially, and to maximize spectrum reuse and data throughput, orthogonalization procedure can be applied to vectors $X_n$ before forming vector $X(t)$ in Eq. (1). Other processing to vectors $X_n$ prior to forming vector $X(t)$ may also be applied to achieve desired transmission characteristics. It is also noted that since the RF beam forming happens at the symbol rate, the channel state encoded in vectors $X_n$ can also be updated at the same rate. This provides means to follow dynamic changes in the channel-state space induced, for example, by moving objects. Such ability will be particularly valuable when transitioning to higher frequencies where small physical displacement may correspond to multiple wavelengths of the transmitted RF, and therefore a potentially considerable change in channel state. In the absence of sufficiently frequent channel-state measurement, instantaneous states of the channels can be approximated by extrapolation from the available measurements.

In free space, each RF beam may correspond to a single physical beam (e.g., cone shaped) of RF radiation whose center is directed to an end user UE. In typical usage, due to the presence of scattering from objects in the RF scene, each RF beam may be formed differently. For example, an RF beam may comprise a wave-front generated at the antenna array, that upon interacting with (scattering off of) the environment, 'converges' on the intended target (or targets), e.g., converges on the user equipment (UE). For example, if there is a wall in the scene, then the array may send two separate 'physical' beams as the RF beam, a first physical beam pointing to and sent directly to the target (UE), and a second physical beam to be reflected from the wall and impinge the target (UE), so that both the first and second physical beams intersect at the intended target. In this example, the combination of these two 'physical' beams constitute a single RF beam.

In general, each complex vector $X_n$ defines an RF beam with values of the vector elements selected to take into account environmental scattering (walls, buildings, cars, etc.) and the position(s) of the UE(-s) so as to produce the desirable electromagnetic field at the UE(-s). (Note, however, in some examples, a complex vector $X_n$ may be defined to produce a minimum field at locations that are not the target to minimize interference.) In the simple case of free space, this RF beam may take a particularly simple form, i.e. a conical distribution of electromagnetic field, that is obtained by phase shifting RF outputs of each antenna across the array. However, in general, generating each desired RF beam typically entails the adjustment of both amplitude and phase at the individual antenna elements to apply a certain amplitude and phase profile to the antenna array. Thus, each antenna in the antenna array is provided with corresponding phase and amplitude component values corresponding to each complex vector $X_n$ (defining the amplitude and phase profile for the RF beam) where the final phase and amplitude of the RF signal output by each antenna corresponds to the summation of these corresponding phase and amplitude component values of each of the complex vectors $X_1 \ldots X_N$ multiplied by respective data streams $D_1(t), \ldots, D_N(t)$ to simultaneously generate each of the RF beams modulated by the respective data stream.

Each complex vector $X_n$ comprises M complex entries (a complex number as an entry with two real numbers rather than a single real scalar value), where M is equal to the number of antennas in the array. Each complex vector $X_n$ forms a column in matrix X. In other words, matrix X consists of N columns complex vectors $X_n$ where each vector complex vector $X_n$ has M entries. So, matrix X is an M-by-N matrix.

In this example, the X matrix is built out of columns of $X_n$ vectors ($X_1$, $X_2$, etc.). Each of the $X_n$ vector column defines an amplitude+phase profile across the antenna array 400 that generates the desired RF beam and thus may define one or more locations where the RF beam converges (respectively associated with one or more UEs). This provides a direct 1-to-1 correspondence between each of vectors $X_n$ and a corresponding RF beam generated by the antenna array 400.

The data stream $D_n(t)$ is multiplied with a respective vector $X_n$ to produce an RF beam modulated with said data stream to converge at a particular location or set of locations that is unique to that data stream (and vector $X_n$). Each data stream $D_n(t)$ may be thought of as a stream of complex numbers (e.g. I/Q), where each number corresponds to a point in the respective constellation (e.g., QAM constellation), i.e., a symbol. The present invention does not place any limit on the type of constellation used and thus multiple encoding schemes maybe implemented, such as OOK, QPSK, any QAM (16-QAM, 64-QAM, 256-QAM . . . ), or even analog modulation, such as AM, FM, PM. As noted herein, further schemes that may be implemented include TDMA, OFDM, and CDMA.

Figure 4A:
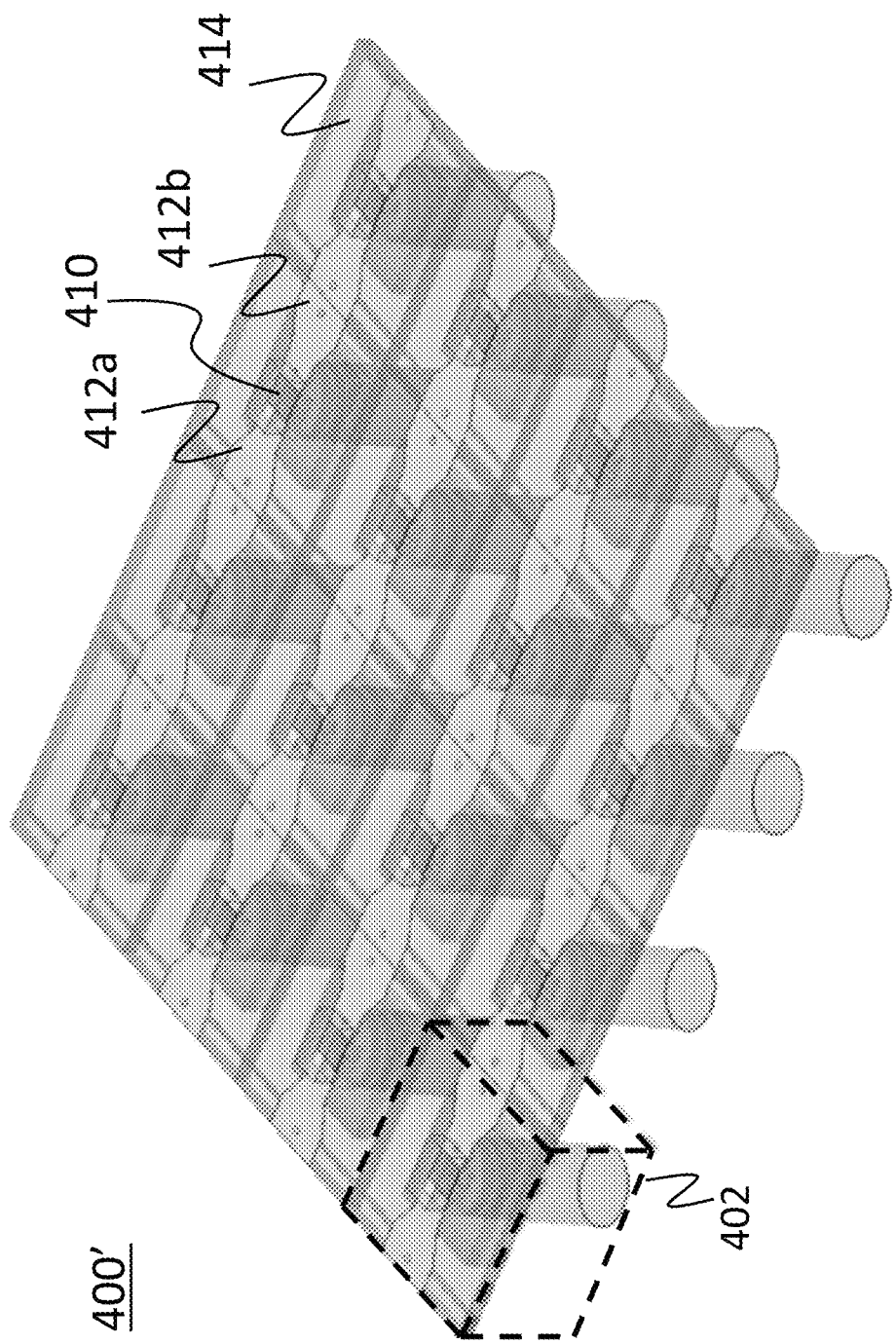
FIG. 4A illustrates one example of the structure of the antenna array of FIG. 1.

FIG. 4A illustrates one example of the structure of the transmitter antenna array 400 of FIG. 1. In this example, the transmitter array 400 is implemented as a photo-diode coupled tightly coupled array (TCA) 400' shown comprising of an array of dipole antennas (412a, 412b) excited by photodiodes 410 (which may embody the photodetectors 410 described herein) on the back surface of substrate 414. Each unit cell 402 of the TCA 400' comprises a dipole antenna (412a, 412b) having two conductive radiating arms 412a and 412b and a photodiode 410 electrically connected to the radiating arms 412a and 412b to act as a driving source for the dipole antenna (412a, 412b) of the unit cell 402. In this example, the TCA 400' comprises a plurality of unit cells 402 regularly arranged in two directions.

Figure 4B:
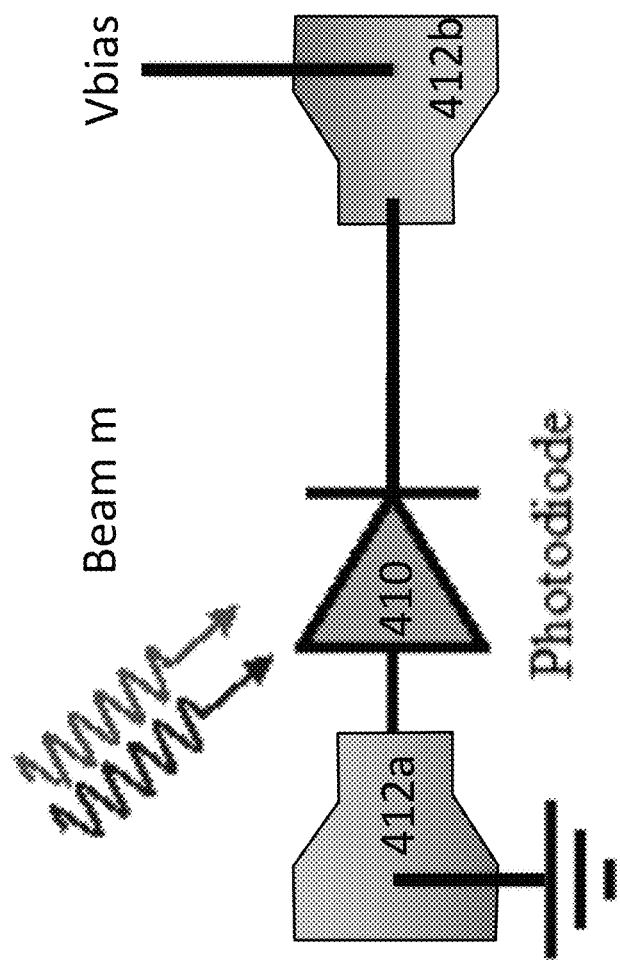
FIG. 4B is a schematic showing an electrical connection between a dipole antenna and a photodiode that may be used as unit cell of the transmitter antenna array of FIG. 4A.

As shown in FIG. 4B, for each pair of a dipole antenna 412 and a photodiode 410 of a unit cell 402, an anode of the photodiode 410 is electrically connected to one of the radiating arms 412a and a cathode of the photodiode 410 is connected electrically connected to another of the radiating arms 412b. As shown in FIG. 4B, the photodiode may be arranged to receive Beam m described in connection with FIG. 1, composed of two optical beams having different wavelengths to excite the dipole antenna 412.

Although the example TCA of A is shown to be arranged in a planar formation, on a planar substrate 414, the substrate 414 need not be planar as shown in FIG. 4A, and instead may comprise curved surfaces, such as a concave and/or convex surface. For example, the substrate on which the antennas 412 are arranged may comprise or be formed to conform to a curved surface (e.g., body or wing) of an aircraft, and thus the arrangement of the antennas 412 may be non-planar. Details of and other examples of antenna arrays that may be used as the photo-diode connected transmitter array 400 are described in U.S. patent Ser. No. 15/242,459 filed Aug. 19, 2016, the contents of which are hereby incorporated by reference.

The transmitter array 400 need not be a TCA array and may have other configurations, such as spherical, hemispherical, circular, conformally placed antennas 412 on various non-planar surfaces, and need not have a regular arrangement of antennas 412. FIG. 4C illustrates one example of an arrangement where the photo-diode driven antennas are arranged in a circle.

Figure 7:
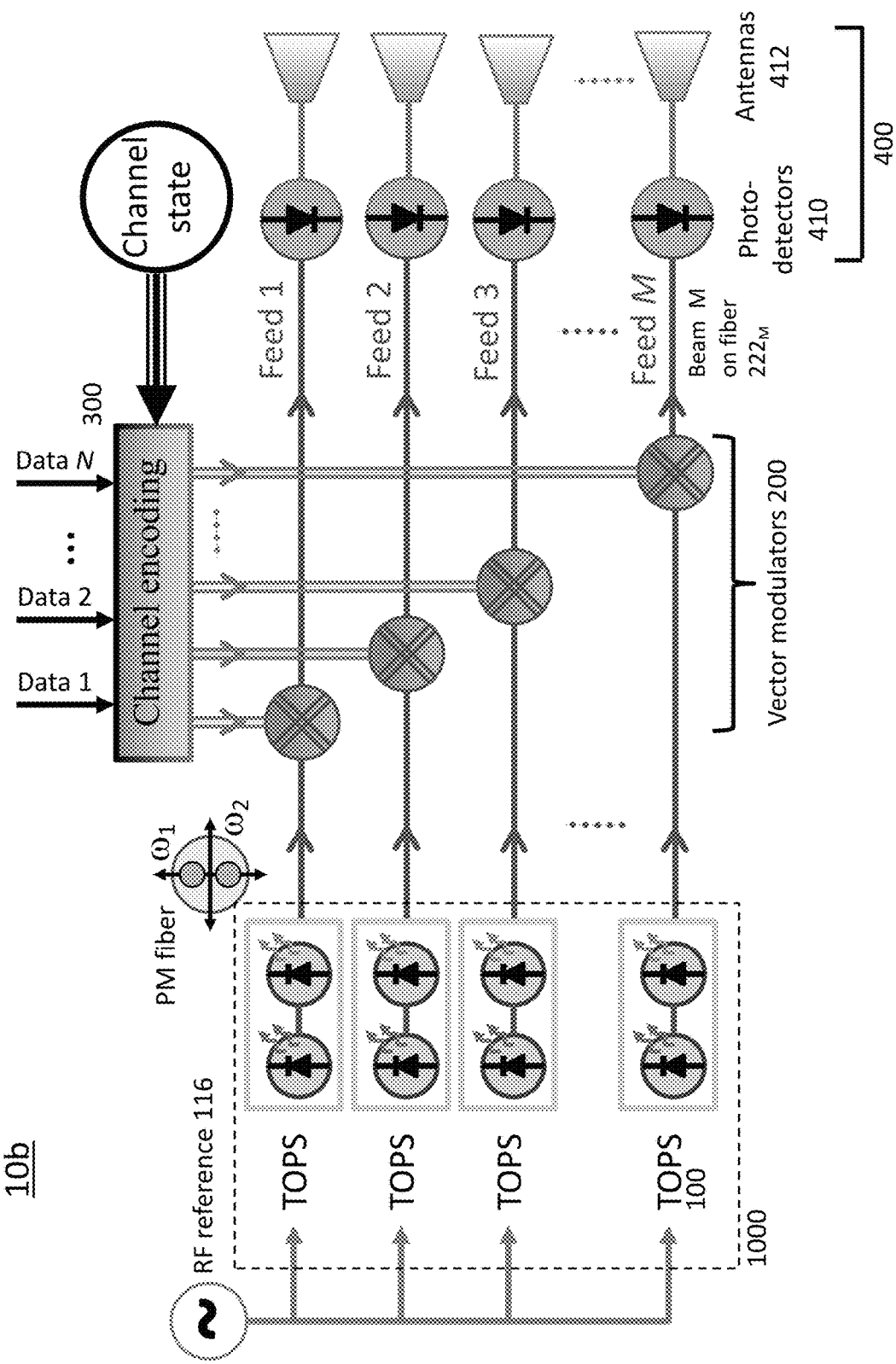
FIG. 7 illustrates an exemplary implementation that may be used in accordance with the structure and methods of FIG. 1 or FIG. 6.

FIG. 7 illustrates another exemplary implementation. The components of the vector modulator array 200, the channel encoder 300 and the antenna array 400 may be the same as that described herein (including the plural sub-system alternative described with respect to FIG. 6). In FIG. 7, plural tunable optical paired sources (TOPSes) 100 are implemented in a TOPS module 1000 for the transmitting antenna array 10b. In this example, one TOPS 100 is provided for each photodetector 410/antenna 412 pair (a photodiode driven antenna). However, each TOPS 100 may be provided for a different subsets of pairs of photodetector 410/antenna 412. By providing plural TOPS 100, the light beam intensity may be increased as the Beams 1-M impinge on the photodetectors 410m as compared to the single TOPS embodiment described with respect to FIG. 1. Thus, each photodetector 410 may have a similarly increased RF power output to drive the corresponding antenna 412m to which it is connected. Such increase in power may be helpful to drive the antennas 412 without the need of an amplifier to amplify the RF signal output by the photodetector 410, not only reducing costs associated the amplifier, but also avoiding signal imbalance in the differential signal output by the photodetector (which is often required to be corrected by the use of expensive baluns).

The TOPS 100 of the TOPS module 1000 are connected to the same RF reference 116 to receive the same RF reference signal. Sharing the RF reference 116 causes the output optical beams 114a, 114b to be RF phase locked—that is, the beat frequencies (as described herein with respect to FIG. 5) of the optical beam pairs (optical beams 114a, 114b when combined) will be in phase, and thus without any further downstream modulation, the phases of the RF signals generated by the photodetectors 410m and antennas 412m will also be in phase. The output optical beams 114a, 114b of each TOPS 100 need not be mutually coherent with any other TOPS 100. Thus, optical beams 114a (e.g., the relative higher frequency optical beam of the pair of optical beams 114a, 114b) output from each TOPS 100 may have different frequencies and different wavelengths from each other and optical beams 114b (e.g., the relative lower frequency optical beam of the pair of optical beams 114a, 114b) output from each TOPS 100 may have different frequencies and different wavelengths from each other. However, the RF reference 116 will cause each optical beam pair 114a, 114b to have the same wavelength offset (the same difference in wavelengths and thus resulting in the same RF frequency used to drive the photodetectors 410m). Although not shown in FIGS. 6 and 7, each of the RF references of these embodiments may have its output RF frequency adjusted as described above with respect to FIG. 1.

Figure 9A:
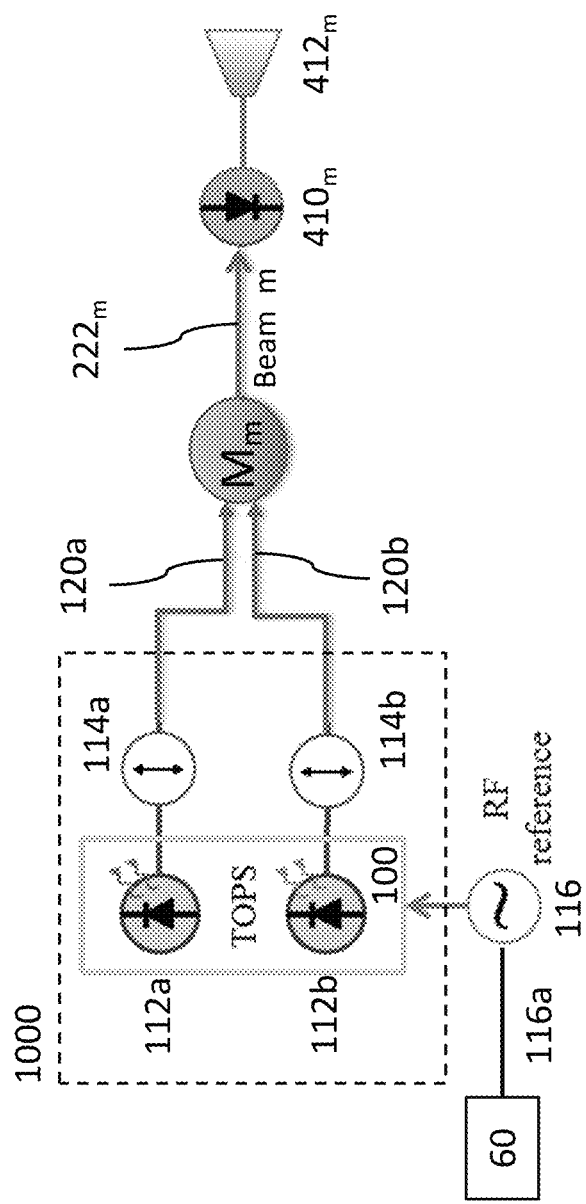
FIG. 9A illustrates an alternative configuration of optical beam path and modulation.

FIG. 9A illustrates a transmitter 10c according to another embodiment. Elements having the same reference numbers correspond to those described above, and thus duplicative description may be omitted. The transmitter 10c of FIG. 9A may comprise a single antenna $412_m$ as shown in FIG. 9A or may be formed to transmit signals from an antenna array having plural antennas $412_m$, as will be described below (use of subscript "m" is maintained for ease of description regarding implementation of FIG. 9A as part of a larger antenna array, even though the transmitter may be used with just a single antenna). A tunable optical paired source TOPS 100 is provided including lasers 112a, 112b. As described herein, lasers 112a, 112b each emit a light beam 114a, 114b, where the wavelengths (and frequencies) of the light beams 114a, 114b are offset. In contrast to other TOPS modules 1000 described herein, the optical beams 114a, 114b are not initially combined and instead are input to modulator M on separate optical fibers 120a, 120b. Each of the optical beams 114a, 114b is polarized. The polarization of these optical beams 114a, 114b may be in the same direction (as represented in FIG. 9A), or may be in different directions. The optical fibers 120a, 120b may be polarization maintaining fibers. However, as the distance between the lasers 112a, 112b and the modulator $M_m$ may be short, other types of optical fibers may be used. In addition, other implementations to optically connect modulator $M_m$ and lasers 112a, 112b may be used, such as using other types of waveguides other than optical fibers. In some examples, modulator $M_m$ and lasers 112a, 112b may be integrally formed, such as part of the same semiconductor chip or semiconductor package.

Modulator $M_m$ combines beams 114a, 114b as well as performing phase and/or amplitude modulation on one or both of the pair of optical beams 114a, 114b (and/or their combination). The combined beams 114a, 114b are combined by modulator $M_m$ with their polarization directions aligned and output on optical fiber 222m. Optical fiber 222m need not be a polarization maintaining fiber.

At this stage, the two optical beams 114a, 114b, forming a combined beam Beam m, may be processed in the same manner with the same structure as described with respect to the embodiments described above. For example, the two optical beams 114a, 114b, differing in wavelength, travel together on optical fiber $222_m$, and as a result, the environmental effects such as acoustics, vibration or temperature variation on the relative phase between the beams may be minimized. At the output of optical fiber $222_m$, the beam is emitted onto photodiode $410_m$, where its energy is converted into an electrical signal (an RF electrical signal) which is then used to operate antenna $412_m$. The RF electrical signal output from the photodiode $410_m$, may first be amplified and the amplified signal may drive antenna $412_m$ or the RF electrical signal generated by the photodiode $410_m$ itself may drive antenna $412_m$.

The polarization direction of the combined optical beams 114a, 114b forming combined beam Beam m are aligned and not orthogonal to each other, the combined optical beams 114a, 114b interfere with each other, such as described with respect to FIG. 5. Combined Beam m thus may be provided with a beat frequency of $|f_2 - f_1|$, where $f_2$ and $f_1$ may be the frequencies of the lasers 112a and 112b (and having a difference determined by RF reference 116). This beat frequency corresponds to the RF frequency, both in amplitude and phase, of the RF electromagnetic wave output by the corresponding antenna 412m.

Figure 9B:
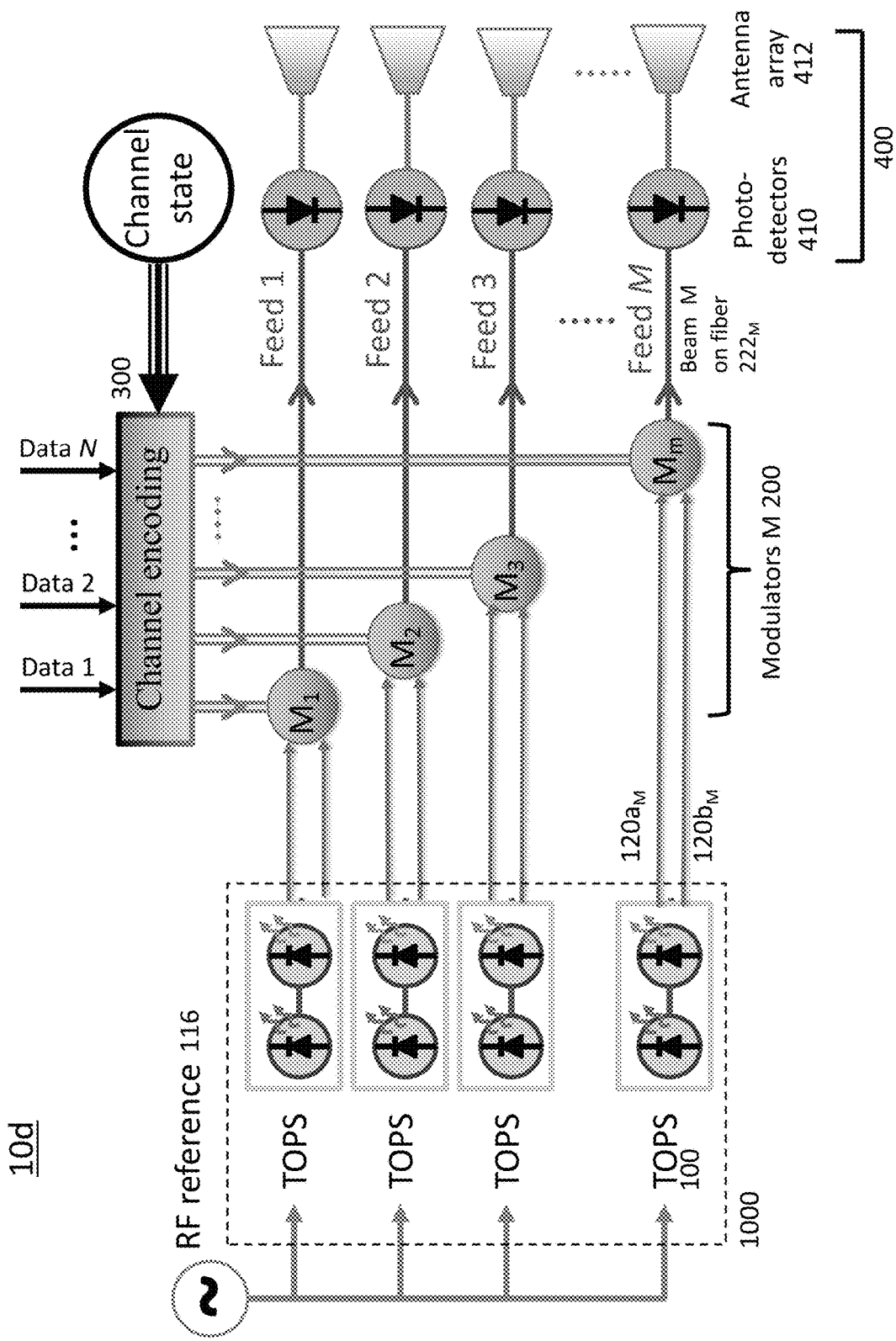
FIG. 9B illustrates an alternative embodiment of antenna transmitter that uses beam-path configuration of FIG. 9A.

FIG. 9B illustrates one use of the device of FIG. 9A implemented to drive plural antennas 412 of an antenna array 400. This example may be the same as the embodiment of FIG. 7, except as related to the differences described with respect to FIG. 9A in connection with maintaining separation of the optical beam pairs 114a, 114b output by each TOPS 100 until combined by modulator $M_m$. As described with respect to FIG. 7, each of the TOPS 100 of the TOPS module 1000 may receive the same RF reference signal so that the frequency difference of each pair of optical beams optical beams 114a, 114b is the same (although the frequencies and wavelengths of one pair of optical beams 114a, 114b may be different from those of other pairs of optical beams 114*a*, 114*b*). Like the embodiment of FIG. 7, the embodiment of FIG. 9B may also include channel encoding as described herein, such as that described with respect to FIG. 3B. The channel encoding may result in one or more discrete communication channels, with each communication channel able to convey information from multiple data streams (Data n) encoded with conventional encoding techniques, such as TDMA (time division multiple access), OFDM (orthogonal frequency division multiplexing), CDMA (code division multiple access), etc. In addition, several users (several UEs) may share the same frequency or frequencies of the communication channel. The channel encoding may result in modulation and driving of antenna array 400 as two or more RF beams with the multiple RF beams simultaneously transmitted to converge at different locations associated with different UEs, and thus implement spatial modulation. In such an instance, the signals received by the different UEs at different locations may otherwise interfere with one another if not spatially separated.

Figure 9C:
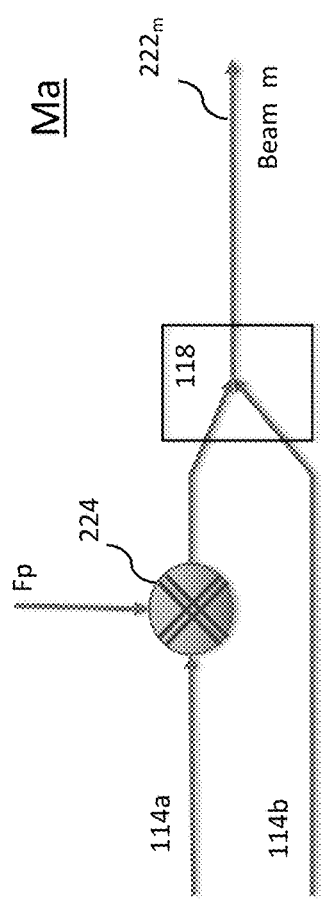
FIGS. 9C through 9F show various alternatives for modulating and combining two optical signals into a single beam.

FIGS. 9C-9F illustrate exemplary modulators (Ma, Mb, Mc, and Md) that may form the modulator(s) $M_m$ of FIGS. 9A and 9B to modulate one or both of the optical beams 114*a*, 114*b* provided by a TOPS 100 of the TOPS module 1000. FIG. 9C illustrates optical beam 114*a* modulated by phase modulator 224 in response to phase-modulation signal Fp. The phase modulator 224 may thus adjust the relative phase of optical beams 114*a* and 114*b* in response to phase-modulation signal Fp. The phase modulated optical beam 114*a* and optical beam 114*b* are combined in optical combiner 118 and output on optical fiber $222_m$ as a combined beam (Beam m). The polarization of the optical beams combined by combiner 118 may be aligned so that the optical beams interfere with each other (such as discussed with respect to FIG. 5). The phase modulation of the modulator Ma of FIG. 9C may be used to generate PSK (phase shift keying) modulation, such as BPSK (binary PSK) or QPSK (quadrature PSK) of a corresponding antenna $412_m$.

Figure 9D:
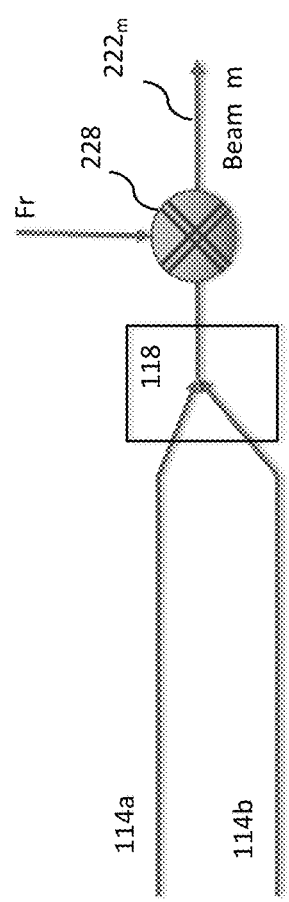

FIG. 9D illustrates an example of first combining optical beams 114*a*, 114*b* with combiner 118 where their polarization directions are aligned in the combined beam output by combiner 118. The combined beam output by combiner 118 may then be subject to amplitude modulation by amplitude modulator 228 in response to amplitude-modulation signal Fr to form Beam m on optical fiber $222_m$. The modulation of the modulator Mb of FIG. 9C may be used to generate amplitude modulation (AM) of a corresponding antenna $412_m$.

Figure 9E:
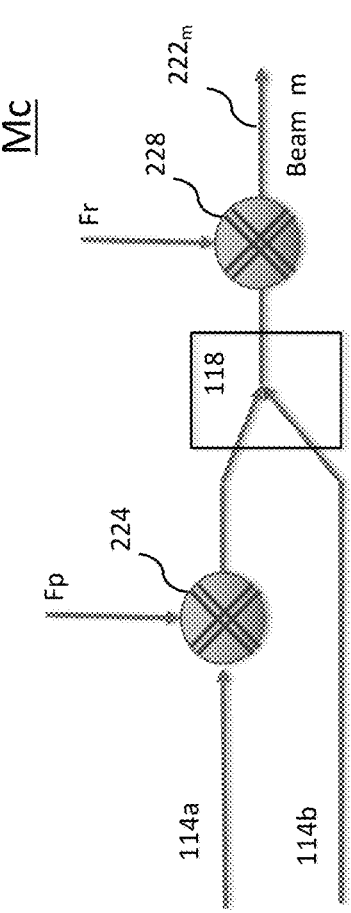

FIG. 9E illustrates an example a modulator Mc which may provide both phase and amplitude modulation. In this example, optical beam 114*a* is phase modulated by phase modulator 224 and then combined by combiner 118 with optical beam 114*b* in response to phase-modulation signal Fp (as done with by modulator Ma of FIG. 9C). The combined beam of the phase modulated optical beam 114*a* and optical beam 114*b* may then be amplitude modulated by amplitude modulator 228 in response to amplitude-modulation signal Fr. The amplitude modulated combined signal may be output as Beam m. Alternatively, modulator Mc may use two amplitude modulators 228 to separately amplitude modulate beams 114*a* and 114*b* prior to combining the same with combiner 118. In this alternative, use of amplitude modulator 228 to amplitude modulate the combined beam—after combiner 118—may be omitted. In addition, this alternative may allow for amplitude-modulation signals (e.g., Fr1, Fr2) to be provided to each of the two amplitude modulators 228. The modulation of the modulator Mc of FIG. 9E may be used to generate quadrature amplitude modulation (QAM) of a corresponding antenna $412_m$, such as 8-QAM, 16-QAM, 32-QAM or 64 QAM.

Figure 9F:
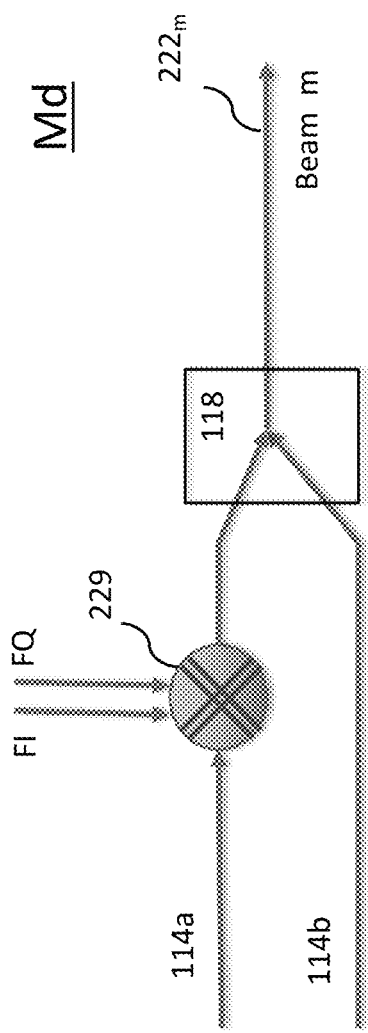

FIG. 9F illustrates optical beam 114*a* modulated by an I/Q modulator 229 in response to modulation signals FI and FQ. The signals FI and FQ in FIG. 9F play the role of Cartesian coordinates of the complex modulation signal where, in some examples, the Fr and Fp may correspond to polar coordinates. The I/Q modulator 229 may thus adjust the relative phase of optical beams 114*a* and 114*b* as well as the amplitude of the optical beam 114*a* in response to modulation signals FI and FQ. The I/Q modulated optical beam 114*a* and optical beam 114*b* are combined in optical combiner 118 and output on optical fiber $222_m$ as a combined beam (Beam m). The polarization of the optical beams combined by combiner 118 may be aligned so that the optical beams interfere with each other (such as discussed with respect to FIG. 5). The modulation of the modulator Md of FIG. 9F may be used to generate quadrature amplitude modulation (QAM) of a corresponding antenna $412_m$, such as 8-QAM, 16-QAM, 32-QAM or 64 QAM.

The phase modulators 224 and amplitude modulators 228 may be the same as described herein. For example, each phase modulator 224 may comprise a lithium-niobate modulator and each amplitude modulator 228 may comprise a Mach-Zehnder push-pull modulator. In addition, phase-modulation signal Fp and amplitude information Fr may be generated and provided to the phase modulators 224 and amplitude modulators 228 as described elsewhere herein and may provide the beam steering and multiple beam formation (along with spatial modulation) as described herein. Similarly, modulation signals FI and FQ may be generated and provided to modulator 229 as described elsewhere herein and may provide the beam steering and multiple beam formation (along with spatial modulation) as described herein.

In addition to or instead of the modulation and modulators discussed above with respect to FIGS. 2, 9C, 9D, 9E and 9F, frequency shift keying (FSK) modulation may be implemented by adjusting the voltage 116*a* provided to RF reference source 116 (e.g., a voltage controlled oscillator) by a controller (when 60 is implemented as a controller). For example, 2, 4 or 8 (or more than 8) different voltage levels may be provided as voltage 116*a* to the RF reference 116 to obtain 2, 4 or 8 different RF frequencies that may be generated by antenna $412_m$. It will be apparent that although the example of FIG. 9B illustrates the TOPS 100 of the TOPS module 1000 sharing the same RF reference 116, it may be preferable that the RF reference 116 is not shared between the TOPS 100. Alternatively, the example of FIG. 9B may be modified so that a set of RF reference signals 116 (having different frequencies) may be selected by each of the TOPS 100 (e.g., each TOPS 100 may receive an output from a corresponding multiplexer that may select between multiple RF reference signals received as inputs from multiple RF references 116). Thus, at a first symbol period, each of several groups of TOPS 100 may share a corresponding one of the RF references 116 (which may be modified during the next symbol period). Alternatively, different communication channels may be formed by the same antenna array 400, each channel corresponding to a different RF reference signal and thus to a different RF carrier frequency of a subgroup of the antennas 412. Data of a communication channel may be generated by modulation described elsewhere herein, such as with respect to FIGS. 2, 9C through 9F. The RF reference 116 shared by a subgroup of antennas 412 may be maintained over several symbol periods and modified based on other considerations, such as signal strength and/or altering a number of communication channels. Use of different frequencies in this manner may also be used to implement OFDM communication.

Figure 10A:
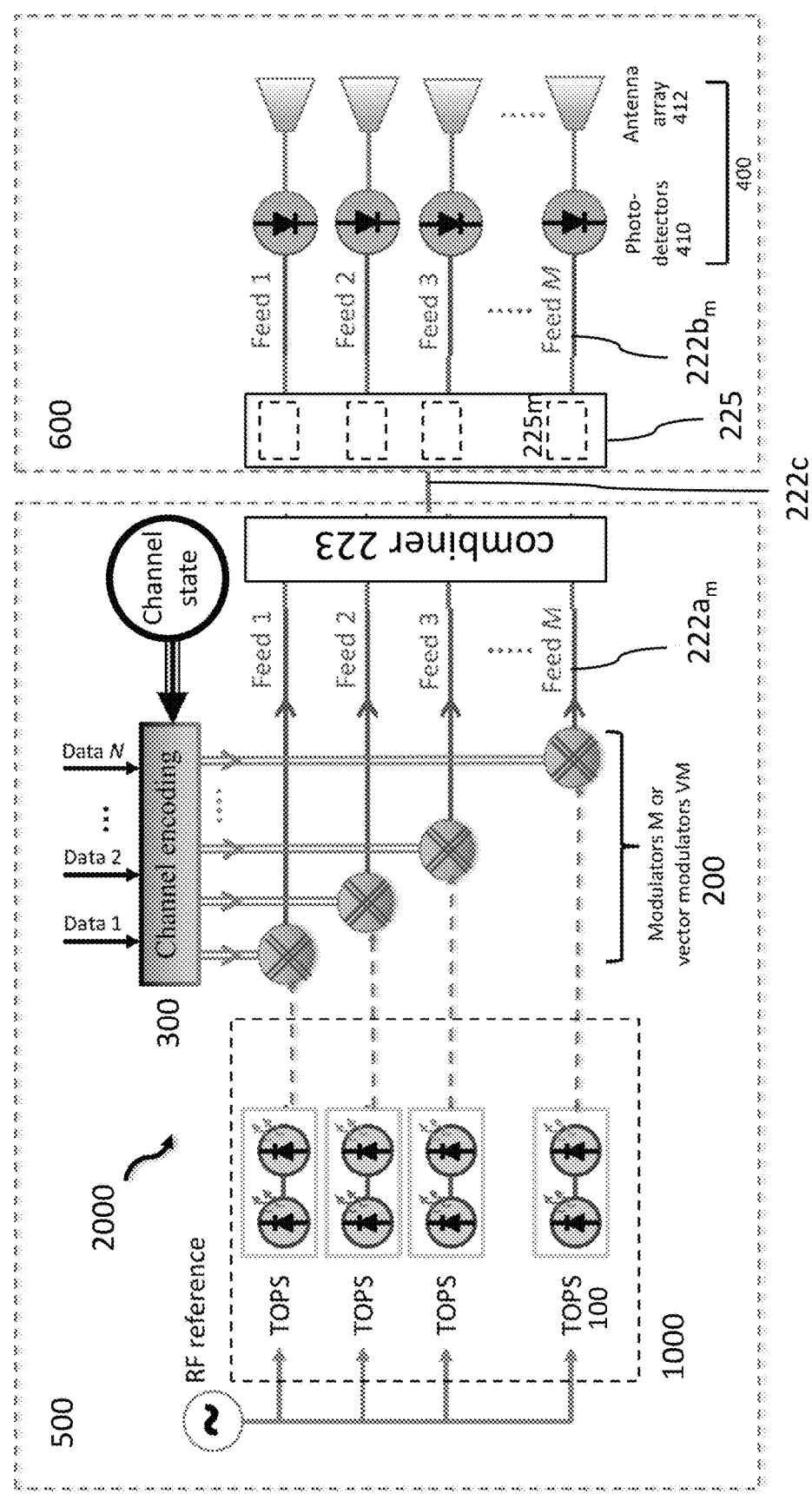
FIGS. 10A through 10E show various ways of dividing the system into functional modules and combining the modules to achieve various system configurations.

FIG. 10A illustrates an embodiment that may be a modification of the embodiment of FIG. 7 or the embodiment of FIG. 9B. As with both the embodiments of FIGS. 7 and 9B, multiple TOPS 100 may be implemented as part of a TOPS module 1000, each TOPS 100 generating a pair of optical beams 114a, 114b that are modulated, either after combining into a combined beam by a modulator (such as vector modulator VM as described with respect to FIG. 7) or prior to combining by a modulator $M_m$ (as with respect to FIG. 9B). Dashed lines from TOPS 100 of TOPS module 1000 to modulators M (which may be vector modulators VM) in FIG. 9B represent both of these alternative implementations (e.g., a dashed line represents a PM optical fiber 120 transmitting a combined optical beam from TOPS 100 to a modulator M (e.g., vector modulator VM) and also represents a pair of optical fibers transmitting optical beams 114a, 114b to a modulator $M_m$).

As described with respect to the embodiments of FIG. 7 and FIG. 9B, the outputs of modulators each comprise a combined beam pair 114a, 114b having a beat frequency that may be phase and/or amplitude modulated by corresponding modulation of one or both of the optical beams 114a, 114b. As shown in FIG. 10A, the optical fibers $222a_m$ carrying combined beam pairs output from each of the modulators are connected to an optical combiner 223 where the plural combined beam pairs are combined and output on the same optical fiber 222c. All combined beams Beam 1, Beam 2, . . . Beam M (corresponding to Feed 1, Feed 2, . . . Feed M in FIG. 10A), now forming a larger combination of all pairs of combined beams as generated by the plural TOPS 100 and modulated, are transmitted by the same optical fiber 222c to a plurality of optical filters 225. The tops module 1000, modulator array 200, combiner 223 and their optical fiber connections constitute an optical processing engine 2000 according to embodiments herein.

A WDM or DWDM multiplexer may be used as the optical combiner 223 and a WDM or DWDM demultiplexer may be used as the plurality of optical filters 225 (WDM referring to wavelength-divisional multiplexing and DWDM referring to dense WDM). Specifically, each of the combined beams Beam 1, Beam 2, . . . Beam M are separated out from the larger combination of optical beams transmitted on optical fiber 222c by a corresponding bandpass filter $225_m$ having a bandpass frequency allowing one pair of optical beams 114a, 114b (as provided in a combined beam Beam m) to be transmitted while not allowing the remaining pairs of optical beams 114a, 114b to be transmitted. Alternatively, an arrayed waveguide grating (AWG) may be used as an optical combiner 223 and/or filters 225 to, respectively, combine and separate the combined beams Beam 1, Beam 2, . . . Beam M. Thus, each of the combined beams Beam 1, Beam 2, . . . Beam M are individually extracted from the larger combination of optical beams (transmitted on optical fiber 222c) and transmitted to a corresponding photodetector $410_m$ and antenna $412_m$.

As noted, each of the optical filters $225_m$ has a different bandpass in the optical frequency range, such as within the infrared, visible or ultraviolet light frequency ranges. As a simplified example, assume three optical filters $225_m$ correspond to a red filter, a green filter and a blue filter, e.g., where such filters pass red light, green light and blue light, respectively. Three different TOPS 100 may generate optical beam pairs 114a, 114b as a pair of red optical beams, a pair of green optical beams and a pair of blue optical beams, respectively. Such red, green and blue optical beam pairs 114a, 114b may then be combined by combiner 223, transmitted by a single optical fiber 222c and then separated out from the larger optical beam transmitted by fiber 222c by a corresponding separate filter (here, red, green and blue filters). As noted, the frequency difference of each pair optical beams 114a, 114b output by a TOPS 100 corresponds to the frequency output by a corresponding antenna 412 modulated by the corresponding combined optical beam (Beam m). These frequency differences may be in the RF frequency range, and thus range from 30 kHz to 300 GHz and thus each pair of optical beams 114a, 114b output by a TOPS 100, 100c may be made quite close in frequency with respect to frequencies of the optical domain. For example, visible light sources for TOPS 100 optical beams 114a, 114b may have a frequency of several hundred THz, about 10000 times or more the frequency of higher RF frequencies, such as microwaves. As such many types of conventional optical filters may be used as filters 225 to appropriate filter pairs of optical beams 114a, 114b from each other, when such optical beams pairs are separated from each other in the optical frequency range.

Providing different frequencies of the optical beams 114a, 114b output by the different TOPS 100 may be obtained by adjusting the frequency of each of the master lasers of the TOPS 100 (one of 112a, 112b) to be substantially different from each other TOPS 100. More specifically, each master laser may be set to a frequency corresponding to a bandwidth of a corresponding filter $225_m$, preferably substantially at the center frequency of the corresponding bandwidth. For example, such adjustment may be done by using tunable lasers for each the lasers of the TOPS 100. Slave lasers of the TOPS 100 (the other of 112a, 112b) will be offset from the master laser frequency by a small amount (as discussed herein) and will also fall within the corresponding bandwidth of a corresponding one of the filters $225_m$. See, e.g., Application No. 62/289,673 and Schneider et al., incorporated by reference herein. As noted herein, although the frequencies of the optical beams 114a, 114b may be different from each other, the RF frequency produced by each pair of optical beams 114a, 114b may be the same by providing the same RF reference to each of the TOPS 100, 100c, and thus each of the antennas $412_m$ of the antenna array may be operated at the same RF frequency.

The system of FIG. 10A may be formed as two subsystems 500, 600 connected by optical fiber 222c. Subsystem 500 is an example of a coherent-signal generator and subsystem 600 is an example of coherent signal extractor, comprising filters 225 and array 400 (comprising an array of photodetectors 410/antenna element 412 pairs). As described herein, the coherent signal generator 500 may generate a plurality of signals that each have an RF frequency component, where all such RF frequency components of such signals are coherent with each other. Specifically, combined beams Beam 1, Beam 2, . . . Beam M provided on Feed 1, Feed 2, . . . Feed M each include a combined beam comprising an interfering pair of optical signals (in this example, respectively 114$a_1$, 114$b_1$, 114$a_2$, 114$b_2$, . . . 114$a_M$, 114$b_M$) that have the same RF beat frequency, corresponding to the frequency of the envelope of the interfering pair of optical signals 114a, 114b forming each of these combined beams Beam m.

Further, these RF beat frequencies may be transmitted without any substantial shifting or offsets occurring between them during the transmission as they may be transmitted in the same optical fiber and subjected to the same environmental conditions (as described herein). As noted, each of these combined beams Beam 1, Beam 2, ... Beam M may be transmitted within a different (and non-overlapping) range or band of optical frequencies. Although there may be some slight shift in the transmission speed between various optical signals pair ($114a_1$, $114b_1$, $114a_2$, $114b_2$, ... $114a_M$, $114b_M$) forming combined beams Beam 1, Beam 2, ... Beam M, such shift may be minute and considered irrelevant as compared to the much lower RF frequency being generated. For instance, assume a combined beam Beam x experiences a full wavelength delay as compared to a second combined beam Beam y due to its transmission through optical fiber 222c via different optical frequency bands. The wavelength of the wavelength delay may correspond to one of the combined beams, such as an average of the wavelengths (or one of the wavelengths) of the optical signal pair 114a, 114b forming the combined beam Beam m. As an RF signal may have a frequency of about 10,000 times less than optical signals, the offset that may be incurred between the corresponding RF signals formed by the combined beams Beam x and Beam y would result in about $1/10,000$ of the RF wavelength and be insignificant. Even a shift of $1/1000$ of the corresponding RF signals is insignificant and may be considered as substantially without any shift (and be considered as a shift between the corresponding RF signals that is substantially equal to zero).

Thus, as can be appreciated, coherent signal generator subsystem 500 and coherent-signal extractor subsystem 600 may be placed at different locations from one another and spaced quite far apart without any effect on RF coherence between the RF signal components of combined beams Beam 1, Beam 2, ... Beam M and thus without any substantial effect on the RF signals output by each of the antennas 412 (e.g., without any undesired shift in such RF signal components and RF signals). Thus, coherent signal generator subsystem 500 and coherent-signal extractor subsystem 600 may be placed 5 or more miles apart, 20 or more miles apart, 100 or more miles apart, or even 500 or more miles apart.

Figure 10B:
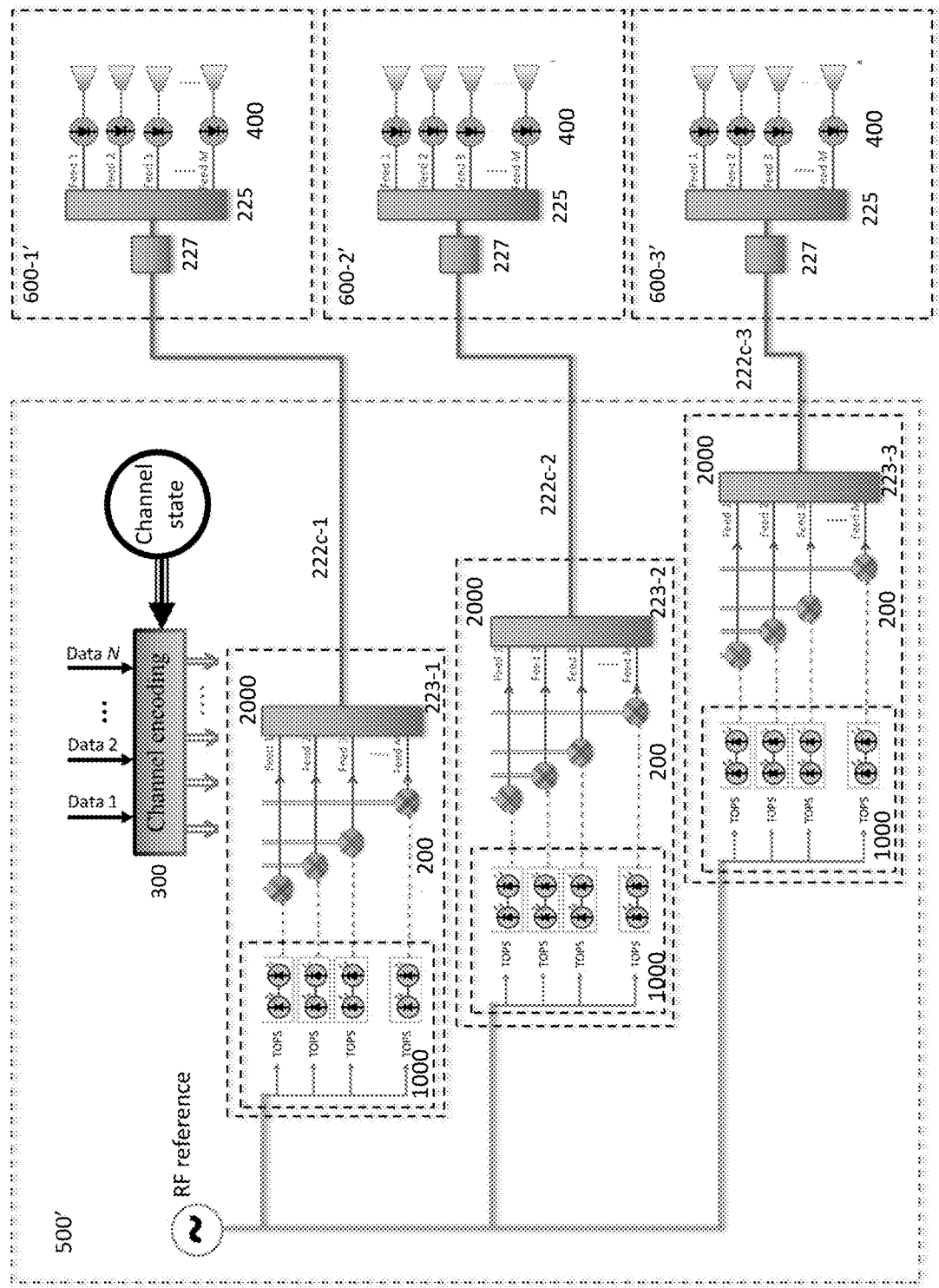

FIG. 10B illustrates a particular implementation of the system described herein with respect to FIG. 10A. As shown in FIG. 10B, plural coherent-signal extractor subsystems 600-1, 600-2 and 600-3 may be connected to the same coherent signal generator subsystem 500'. Each of the elements and operation of the plural coherent-signal extractor subsystems 600-1, 600-2 and 600-3 may be the same as the coherent signal extractor subsystem 600 described with respect to FIG. 10A. In the example shown in FIG. 10B, each of the plural coherent-signal extractor subsystems 600-1, 600-2 and 600-3 also include an adjustable optical delay 227 which may be applied to the corresponding larger combined beams received by coherent-signal extractor subsystems 600-1, 600-2 and 600-3 on optical fibers 222c-1, 222c-2 and 222c-3 respectively. The adjustable delay may comprise a conventional true time delay (TTD) element, and/or spooled segments of optical fiber, and have it adjusted to compensate for differences in the lengths of optical fibers 222c-1, 222c-2 and 222c-3 and thus the travel time of the combined optical signals transmitted thereon (in order for the optical signals transmitted thereon to arrive at each of the filters 225 at the same time or at predetermined time offsets, if desired). However, there may be no need to provide such optical delays 227 as the difference in travel time incurred by the different path lengths of optical fibers 222c-1, 222c-2 and 222c-3 may be insignificant in connection with the significantly lower RF frequencies, and/or data bandwidths, being generated by each of the antenna arrays 400 of each of the coherent-signal extractor subsystems 600-1, 600-2 and 600-3.

As shown in FIG. 10B, each of the coherent-signal extractor subsystems 600-1, 600-2 and 600-3 receive only a subset of the combined beams generated by coherent signal generator subsystem 500'. Each of the filters 225 need only include a number of optical bandpass filters equal to the number of combined beams Beam m to be received and extracted for feeding to a corresponding photodiode 410/antenna 412 pair.

The coherent signal generator subsystem 500' of FIG. 10B is configured similar to the coherent signal generator subsystem 500 described with respect to FIG. 10A, with the exception that where coherent signal generator subsystem 500 of FIG. 10A combined all combined beams Beam 1, Beam 2, ... Beam M onto a single optical fiber that was fed to one antenna array 400, coherent signal generator subsystem 500' of FIG. 10B separately combines three sets of combined beam pairs 114a, 114b with three different respective optical combiners 223-1, 223-2, 223-3 and transmits these three separate larger combination of optical beam pairs on three separate respective optical fiber 222c-1, 222c-2 and 222c-3 to the three different coherent-signal extractor subsystems 600-1', 600-2' and 600-3', respectively. It should be appreciated that the channel encoding of channel encoder 300 is applied to each of the modulators M/VM and that each of the three sets of Beam 1, Beam 2, ... Beam M may be provided with different modulation information (the depiction of the same Feeds being output by these three sets of modulators M/VM is for explanatory purposes and does not indicate similarity among the modulation being provided to these three sets of modulators M/VM, although duplicative modulation of the different sets of modulators may be implemented if desired, such as to extend signal coverage if desired).

The coherent signal generator subsystem 500' of FIG. 10B substantially replicates the coherent signal generator subsystem 500 described with respect to FIG. 10A. In this example, coherent signal generator subsystem 500' comprises three optical processing engines 2000. Each of the optical processing engines 2000 may be the same as that described with respect to coherent signal generator subsystem 500 of FIG. 10A and comprises a TOPS module 1000, a modulator array 200 and a beam combiner 223 (which may be the same and operate as described with respect to FIG. 10A). In the particular example of FIG. 10B, one RF reference source 116 and one channel encoder 300 are shared in these replicated optical processing engines 2000. However, multiple RF reference sources 116 (each configurable to provide a RF reference signal having a different frequency) may be provided, where some or all the multiple RF reference sources 116 may be shared by subsets of the optical processing engines 2000. It should be appreciated that the TOPS module 1000 may be implemented as described elsewhere herein, such as described with respect to FIG. 1. In addition, as with the embodiment of FIG. 10A, pairs of optical beams 114a, 114b may be sent on the same fiber to a corresponding modulator (as in FIGS. 1 and 7) or kept separate and sent on separate optical fibers to a modulator (as in FIGS. 9A and 9B). Thus, the same coherent signal generator subsystem 500' may be used to operate plural and physically separate antenna arrays 400 that may be spaced apart from one another by a significant distance (e.g., such as maintaining a spacing greater than 1 mile, greater than 5 miles, or even greater than 20 miles). Such spacing maybe maintained while still generating desired constructive interference and destructive interference of the RF signals and RF beams output by the antenna arrays 400.

Notably, the spatially separated coherent-signal extractor subsystems 600-1', 600-2' and 600-3' may be positioned so as to provide coverage of the same physical area, or substantially overlapping physical areas. In this case, the channel encoder 300 may enable cooperative antenna functionality among the physically distinct antenna arrays 400 of the coherent-signal extractor subsystems 600-1', 600-2' and 600-3', with 'hot spots' of RF field formed at the location or locations of UE or UEs targeted by the data encoded by channel encoder 300. Each 'hot spot' of the RF field formed at a desired location may correspond to constructive interference of RF beams output by several or all of the physically distinct antenna arrays to thereby provide a communication channel at the hot spot having a relatively strong RF carrier signal strength (for the RF carrier signal(s) corresponding to the hot spot communication channel). Destructive interference between RF beams output by several or all of the physically distinct antenna arrays may result in each 'hot spot' location to spatially isolated so that each 'hot spot' location is surrounded by locations having relatively weak RF carrier signal strength (for the RF carrier signal(s) corresponding to the hot spot communication channel). Thus, for the same RF carrier signal, the channel encoder 300 may cause the physically distinct antenna arrays 400 of the coherent-signal extractor subsystems 600-1', 600-2' and 600-3' to generate multiple hot spots that are spatially separate from each other via constructive and destructive interference between RF beams output by the physically distinct antenna arrays. Thus, the same RF carrier signal may be used to simultaneously provide different communications (i.e., different communication channels) at each of these spatially separate hot spots. Due to the spatial separation of such hot spots, interference may be avoided between a first RF communication channel focused at one hot spot and a second RF communication channel focused at another hot spot even when these communication channels are provided using the same RF carrier frequency (or on RF carrier frequencies that may otherwise interfere with each other). It should be appreciated that additional filtering may be provided other than the spatial separation of hot spots as described herein. For example, communication channels provided via RF carrier signals of different RF frequencies may be directed to hot spots formed close together and may avoid interference with one another by appropriately filtering out the unwanted RF carrier frequency to obtain just the desired RF carrier for decoding.

Figure 10C:
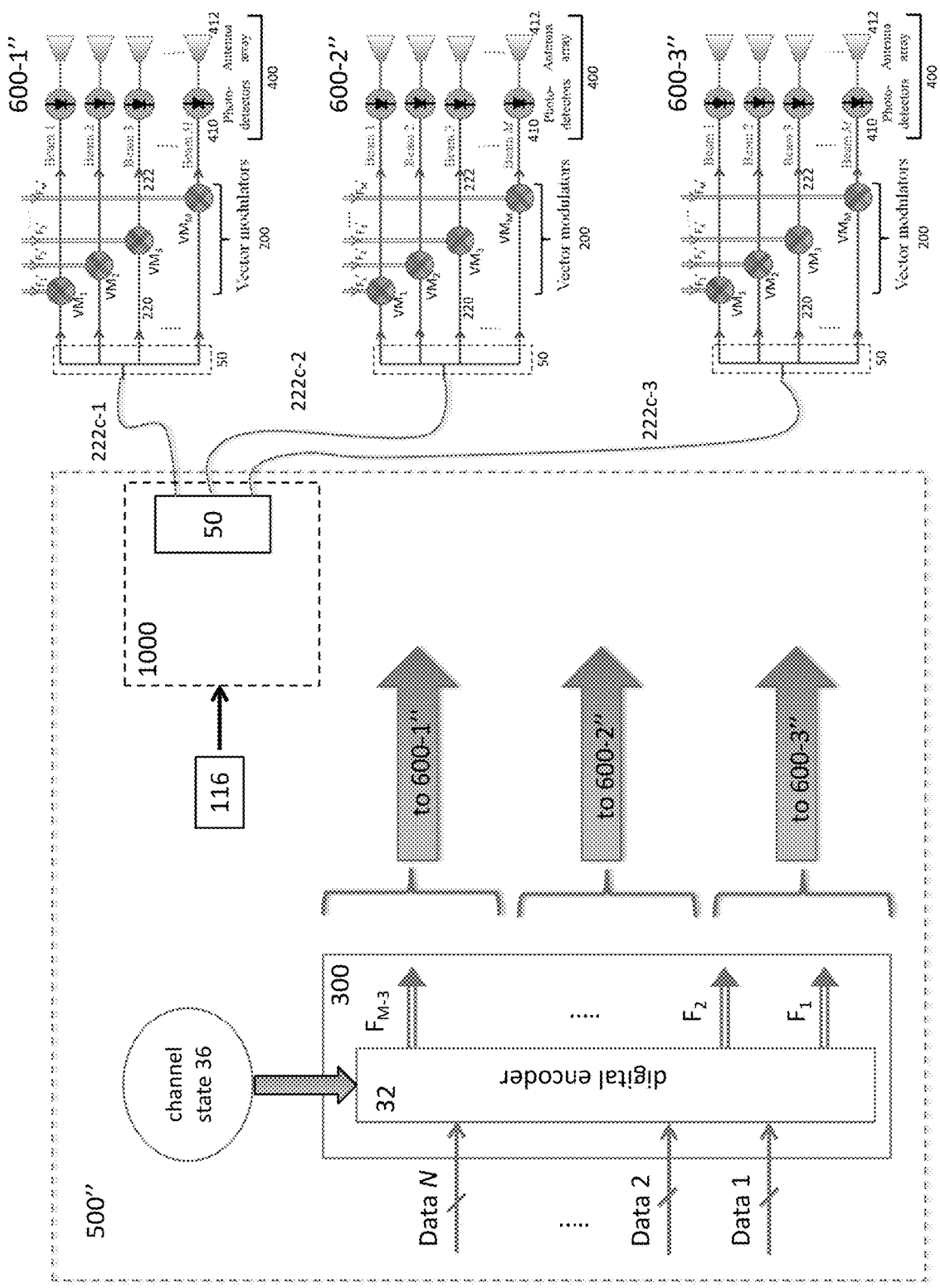

FIG. 10C illustrates another example of a system that may use the same coherent signal generator subsystem (500") to operate plural and physically separate antenna arrays 400 that may be spaced apart from one another by a significant distance while maintaining coherence between the RF signals generated by the physically separate antenna arrays 400. In this example, the structure and operation of the system of FIG. 1 is modified. As with the system of FIG. 1, a TOPS module 1000 generates several pairs of optical beams 114a and 114b. The TOPS module 1000 may be that described with respect to FIG. 1. For example, the TOPS module 1000 may comprise a TOPS 100 that generates an initial pair of optical beams 114a and 114b which are combined by combiner 118 and output on a PM optical fiber 120 such that the polarization directions of the optical beams 114a and 114b are maintained orthogonal to each other in the optical fiber 120 and do not interfere with each other. The optical fiber 120 outputs the optical beams 114a, 114b to a splitter 50, which splits the optical output of the optical fiber (splitting each of the optical beams 114a, 114b), here being split three ways. Each of the three portions of the split optical output are transmitted on optical fibers 222c-1, 222c-2 and 222c-3 to coherent-signal extractor subsystems 600-1", 600-2" and 600-3", where each is split M ways (M need not be the same for each of the coherent-signal extractor subsystems 600), and input to respective ones of M modulators (which may be vector modulators VM) of each subsystem 600. Alternatively, the TOPS module 1000 may be that described elsewhere, such as the TOPS module 1000 of FIG. 7 of FIG. 9B comprising several TOPS 100 that each separately generate a pair of optical beams 114a, 114b that may be combined and transmitted to a modulator array 200 on the same optical fiber (as in FIG. 7) or kept separate and transmitted on separate optical fibers to a modulator array 200 (as in FIG. 9B). In this latter implementation, each of the beam splitter 50 of the TOPS module 1000, each optical fiber 222c connecting the TOPS module 1000 and the coherent-signal extractor subsystems 600, the beam splitter 50 of the coherent-signal extractor subsystems 600 and optical fibers from the beam splitter 50 of the coherent-signal extractor subsystems 600 to the modulators M may be duplicated keeping the optical beams of an optical beam pair 114a, 114b separate until combined by a modulator (e.g., in a manner as described with respect to FIGS. 9A to 9F).

The coherent-signal extractor subsystems 600-1", 600-2" and 600-3" are physically separated from the coherent signal generator subsystem 500" and may each comprise corresponding antenna arrays 400 to operate the same (e.g., drive the corresponding antenna array 400). The coherent signal generator subsystem 500" and coherent-signal extractor subsystems 600-1", 600-2" and 600-3" may be physically separated from one another by substantial distances, such as being placed 5 or more miles apart, 20 or more miles apart, 100 or more miles apart, or even 500 or more miles apart from each other.

The digital encoder 32 of the coherent signal generator subsystem 500" may transform the data streams Data 1, Data 2, . . . Data N into three sets of M complex digital numbers $F_1, F_2 \ldots F_{3M}$ and transmit each set of M complex digital numbers to a corresponding one of coherent-signal extractor subsystems 600-1", 600-2" and 600-3". The transmission of the complex digital numbers may be performed in a variety of ways, such as being encoded and transmitted serially on the same optical fibers 222c-1, 222c-2 and 222c-3 used to transmit optical beams 114a, 114b or being transmitted on another optical fiber (e.g., adjacent to a corresponding one of the optical fibers 222c-1, 222c-2 and 222c-3). Different wavelengths of light may be used to transmit such data in parallel where it may be extracted at the coherent-signal extractor subsystems 600-1", 600-2" and 600-3". Conventional techniques may be used for such data transmission or the transmission of this data may be performed using the novel signal transmission techniques discussed elsewhere herein. At each coherent-signal extractor subsystems 600-1", 600-2" and 600-3", the data (the corresponding portion of the complex digital numbers $F_1, F_2 \ldots F_{3M}$) is extracted and converted to analog form to be transmitted as a signal pairs $F'_1, F'_2 \ldots F'_M$ to the array of vector modulators 200, such as discussed with respect to FIG. 3A, where the optical beams 114a, 114b are modulated and combined, to operate respective photodiode 410/antenna elements 412, as discussed herein with respect to the embodiment of FIG. 1. Alternatively, each of the coherent-signal extractor subsystems 600-1", 600-2" and 600-3" may receive data Data 1, Data 2, . . . Data N and channel state information 36 from coherent signal generator subsystem 500 rather than a set of M complex digital numbers $F_1, F_2 \ldots F_M$ and instead generate a set of M complex digital numbers $F_1, F_2 \ldots F_M$ with a digital encoder 32 provided with the coherent-signal extractor subsystems 600-1", 600-2" and 600-3" (such as in the same manner as discussed herein with respect to FIG. 1, e.g.). It should be appreciated that although FIG. 10C represents the signal pairs $F'_1, F'_2 \ldots F'_M$ at each of the coherent-signal extractor subsystems 600-1", 600-2" and 600-3" with the same reference numerals, the values of the M complex numbers (whether in digital or analog form) will typically be derived independently and thus may differ. Further, the number of complex numbers and antennas need not be the same at each of the coherent-signal extractor subsystems 600-1", 600-2" and 600-3".

FIG. 11A illustrates an exemplary implementation which may be used with the embodiment of FIG. 10B and the embodiment of FIG. 10C. Four towers (e.g., cell phone towers) each have an antenna array 400 (here labeled of 400-1, 400-2, 400-3 and 400-4) mounted thereon. Each antenna array 400 is provided with a signal extractor subsystem 600 (here labeled of 600-1, 600-2, 600-3 and 600-4 which may be those described herein with respect to FIGS. 10B and 10C). Each antenna array 400 may be controlled by the same coherent signal generator subsystem 500 (e.g. 500' or 500" as described with respect to FIGS. 10B and 10C). As coherence between each of the RF signals operating each of the antennas 412 of each of the antenna arrays 400-1, 400-2, 400-3 and 400-4 may be maintained (e.g., no significant offsets or delays occurring due to environmental effects or variations in transmission speeds) as described herein, all of the antenna arrays 400 may be controlled to generate desired constructive interference and desired destructive interference of RF signals being transmitted from the plural antenna arrays 400 and their antenna elements 412, as described herein. Thus, rather than creating constructive interference and destructive interference with a single antenna array, plural arrays having significant spacing between them may be used (and may operating together, or cooperatively, substantially the same as a single antenna array). As noted, the spacing between the plural arrays 400 may be 5 or more miles apart, 20 or more miles apart, 100 or more miles apart, or even 500 or more miles apart while still maintaining coherence between each of the generated RF signals.

As described herein, the coherence of the RF signals may thus be used to increase signal strength (e.g., through constructive interference of RF signals generated by the antenna arrays 400-1, 400-2, 400-3 and 400-4) in desired locations, such as at a location of first user equipment (e.g., UE-1) that is the intended recipient of a first communication channel. The same RF frequency (or frequencies) may also be used to provide a separate second communication channel to a second user equipment (UE-2) at a different location. Such increased signal strength of the first and second communication channels may each be considered a "hot spot" with areas outside such a "hot spot" failing to receive sufficient RF signal strength (or failing to receive a sufficiently noise free RF signal) and thus be unable to receive communications of the communication channels. As the first and second user equipment UE-1 and UE-2 move, the channel encoder 300 may operate to move the appropriate communication channel "hot spot" with the corresponding user equipment UE-1, UE-2 with appropriate modification of the channel state information provided to channel encoder 300. As the RF beams generated to provide the first communication channel and the second communication channel may be spatially separate (e.g., where they converge on the first and second user equipment UE-1 and UE-2 respectively), the systems of FIGS. 10B, 10C and 11A may perform spatial modulation with the same RF frequency band to provide spatially separate first and second communication channels that would otherwise interfere with each other (and thus cause communication failure of such communication channels). As will be apparent, different RF frequencies and modulation techniques may be used so that the same location (e.g., a hot spot location of a particular communication channel) may be provided with plural communication channels as well. As noted herein, the spatial modulation techniques described herein may also be used to suppress communication channel signals (e.g., through destructive interference) at locations not intended to receive such communication channel signals. As another example, UE-3 may not receive either the first or second RF communication channel.

Figure 10D:
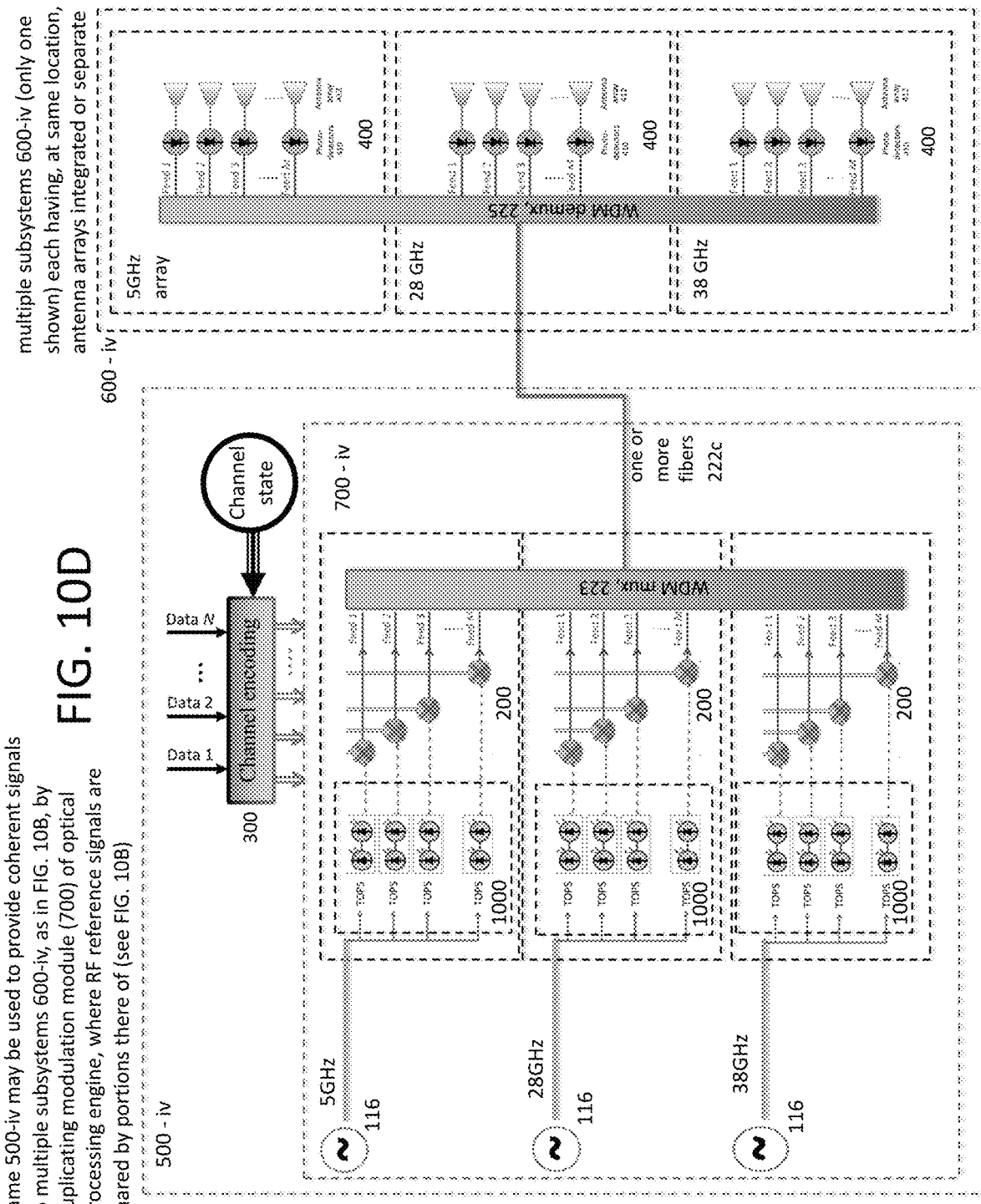

FIG. 10D illustrates another example of a system that may use the same coherent signal generator subsystem (here 500-$iv$) to operate plural antenna arrays 400. One or more coherent-signal extractor subsystems (here 600-$iv$) (one shown in FIG. 10D) may be connected to the coherent signal generator subsystem 500-$iv$. Each coherent-signal extractor subsystems 600-$iv$ is comprised of plural antenna arrays 400, with each of the plural antenna arrays 400 configured to operate at a different RF carrier frequency. In this example, three antenna arrays 400 are illustrated as being part of coherent-signal extractor subsystems 600-$iv$, a 5 GHz antenna array 400, a 28 GHz antenna array 400 and a 38 GHz antenna array 400 (5 GHz, 28 GHz and 38 GHz denoting the RF carrier frequency at which the corresponding antenna array 400 is designed to operate). Of course, additional antenna arrays configured to transmit at different RF carrier frequencies may be provided with the coherent-signal extractor subsystems 600-$iv$. As noted herein, the antenna arrays 400 may operate and communicate with a wide range of radio frequencies, such as millimeter wave (e.g., about 30 to 300 GHz), microwave (e.g., 1 to 170 GHz), SHF (3 GHz to 30 GHz), UHF (300 MHz to 3 GHz), VHF (30 to 300 MHz), to radio frequencies as low as 300 KHz or even 30 KHz. The invention may also be used with other communication frequencies outside of radio frequencies. The antenna arrays 400 may include antenna elements 412 having one or more radiating arms designed to operate with a particular RF carrier frequency and/or a particular RF frequency band (i.e., including the operating RF carrier frequency described herein). For example, such radiating arms may be substantially equal to one half the wavelength of the RF electromagnetic wave at such RF carrier frequency. An antenna array 400 of the coherent-signal extractor subsystems 600-$iv$ configured to operate at a first RF carrier frequency or frequency band may be inoperable at other RF carrier frequencies at which other antenna arrays 400 of the coherent-signal extractor subsystems 600-$iv$ operate.

Each antenna array 400 may be the same as an antenna array 400 described elsewhere herein. For example, the photodiodes 410 of one of the antenna arrays 400 may receive corresponding combined optical beams 114$a$, 114$b$, each having a beat frequency substantially at the corresponding RF carrier frequency. As described herein, the photodiodes may then control and/or drive corresponding antenna elements 412 to which they are connected substantially at this RF carrier frequency. Repetitive details of such structure and operation need not be repeated.

The sets of signals to drive the antenna arrays 400 at different RF carrier frequencies may be generated by the coherent-signal generator 500-$iv$. As shown in FIG. 10D, plural optical processing engines 2000 are connected to different RF reference sources 116 to receive RF reference signals at different frequencies. Each of the optical processing engines 2000 thus produces a plurality of optical beam pairs 114a, 114b having a beat frequency corresponding to the frequency of the RF reference signal received by that optical processing engine 2000. The sets of optical beam pairs 114a, 114b of each of the optical processing engines 2000 may then be combined by WDM multiplexer 223 and transmitted to the coherent-signal extractor subsystems 600-iv on the same optical fiber where they are extracted by WDM demultiplexer 225 (in a manner as described elsewhere herein) to be provided to the appropriate antenna arrays 400 (and to the appropriate photodiode 410/antenna element pairs 412 of each antenna array 400). In this way, the same coherent-signal generator 500-iv may control coherent-signal extractor subsystems 600-iv to operate different antenna arrays 400 at different RF carrier frequencies simultaneously and in real-time. In addition, the different RF frequency signals (in the form of RF beat frequencies of the optical beam pairs 114a, 114b) may be sent to each of the photodiode 410/antenna element pairs 412 together on the same optical fiber (e.g., 222c).

It should be appreciated that the system of FIG. 10D may be formed by substantially duplicating the structure of FIG. 10A for each RF carrier frequency (e.g., to control each antenna array 400). However, transmission of the RF signals (via beat frequencies) at different RF carrier frequencies use the same transmission system (e.g., same optical fibers). In addition, it will be appreciated that channel encoder 300 may be shared by the optical processing engines 2000. This may be helpful to easily provide unique communication channels, such as communication channels including frequency hopping between significantly different RF frequencies and/or communication channels that change to significantly different RF frequencies to improve transmission quality (e.g., selecting an RF carrier frequency for a hot spot that in response to evaluating signal to noise ratios of different RF carrier frequencies for that hot spot). It should be appreciated that with the possible exception of the multiplexer 223, the optical processing engines 2000 may be the same as those described elsewhere herein and their details need not be repeated.

Figure 11B:
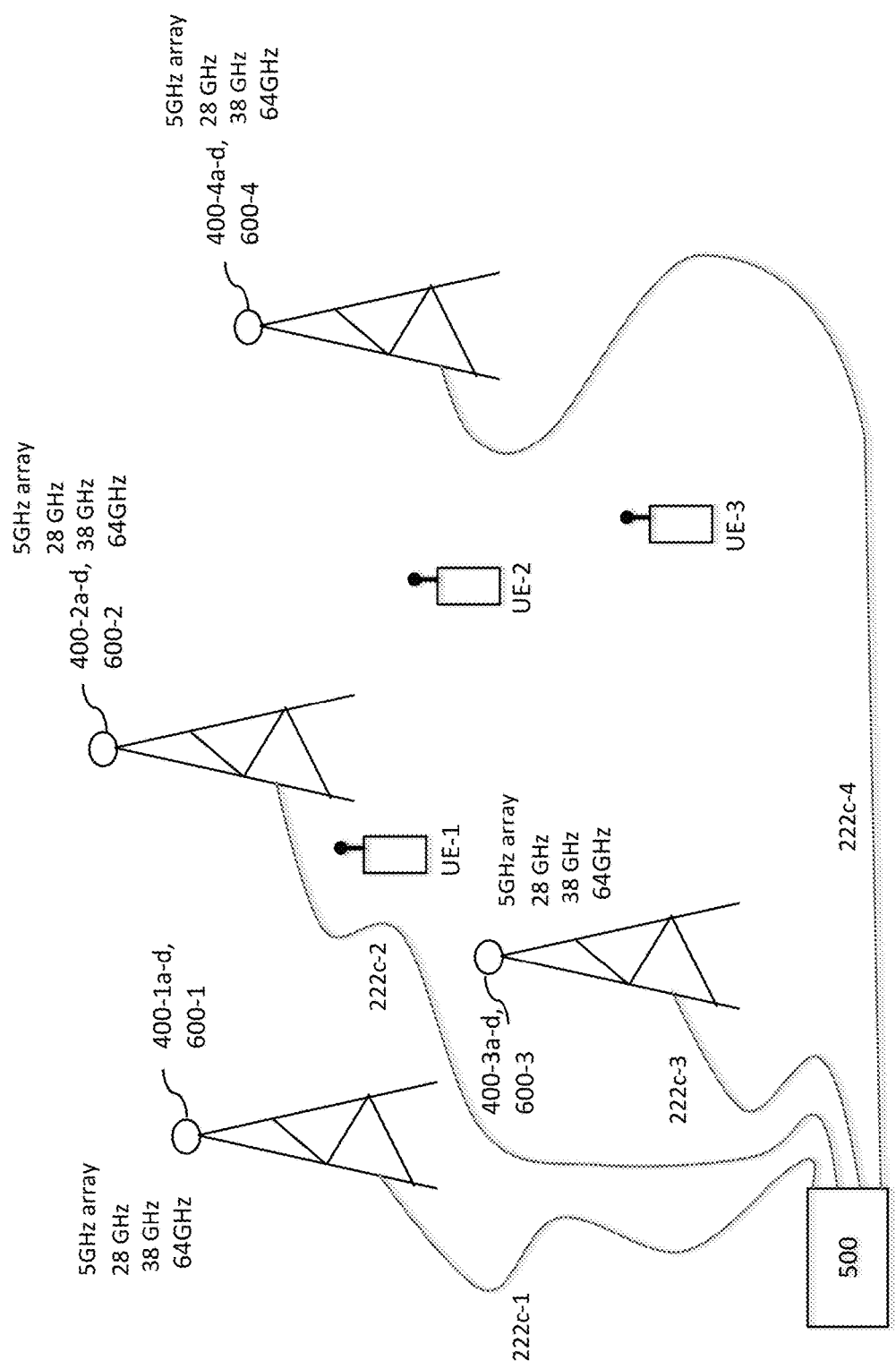

As noted, the embodiment of FIG. 10D contemplates use of multiple coherent-signal extractor subsystems 600-iv (although only one is shown in FIG. 10D). Each of the coherent-signal extractor subsystems 600-iv may be controlled by the same coherent-signal generator 500-iv. FIG. 11B illustrates one example of this configuration. As shown in FIG. 11B, the same coherent-signal generator 500 (e.g., 500-iv of FIG. 10D) may simultaneously provide signals to several control coherent-signal extractor subsystems (600-1, 600-2, 600-3, 600-4) (each of which may correspond to 600-iv of FIG. 10D, e.g.). Plural antenna arrays 400 may be provided as part of each coherent-signal extractor subsystems, each of which operate at different RF carrier frequencies (e.g., 5, 28, 38 and 64 GHz in this example). Each RF carrier frequency may thus be provided and used to generate a corresponding electromagnetic wave at spatially separate locations coherently (with substantially no undesired offset or shift between the RF carrier frequencies). Thus, for each RF carrier frequency, the different spaced apart arrays may cooperate to provide spatial modulation for each frequency (providing constructive and destructive interference to control locations of "hot spots" directed to locations of user equipment UE). A single optical fiber may be used for transmission between 500 and each coherent-signal extractor subsystems. Thus, antenna arrays 400 configured to operate at the same RF carrier frequency (or same RF frequency band) may provide coherent RF signal components. As same RF carrier frequency antenna arrays 400 may operate coherently, they may be controlled to generate RF beams that generate spatially distinct hot spots and an associated communication channel for that RF carrier frequency. Such hot spot generation has been described elsewhere and need not be repeated here.

Figure 10E:
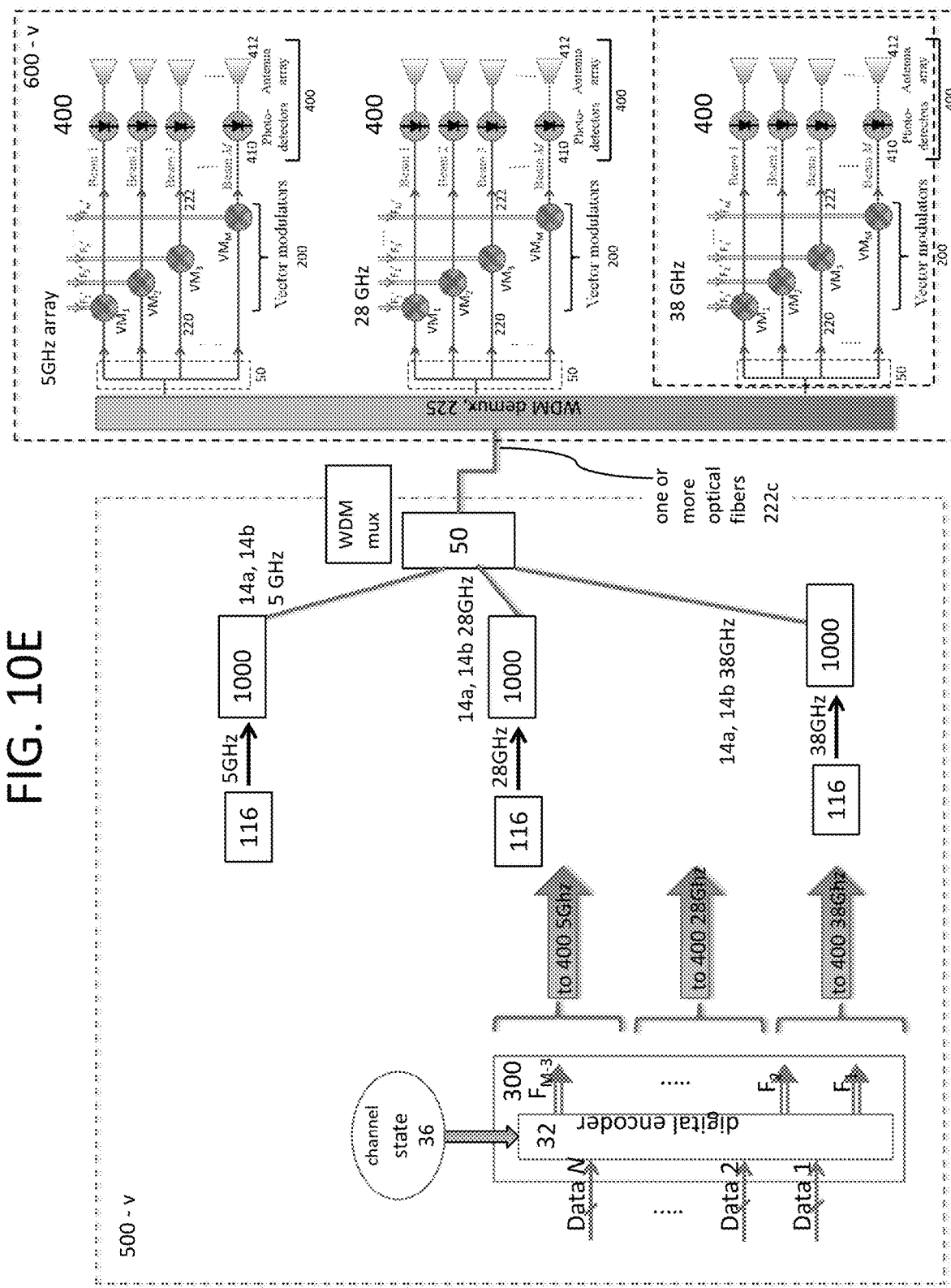

FIG. 10E illustrates another example of a system that may use the same coherent signal generator subsystem (here 500-v) to simultaneously operate plural antenna arrays 400. One or more coherent-signal extractor subsystems (here 600-v) (only one shown in FIG. 10D) may be connected to the same coherent signal generator subsystem 500-v. The example of FIG. 10E is an alternative of the system of FIG. 10D in a similar manner that the embodiment of FIG. 10C is an alternative to the embodiment of FIG. 10B. As will be appreciated, the optical processing engines 2000 illustrated in FIG. 10D are modified such that the TOPS module 1000 is separated from the modulator 200 that modulates the optical beam pairs 114a, 114b provided by that TOPS module 1000. For each of the different RF carrier frequencies, an optical beam pair 14a, 14b having a beat frequency at the corresponding RF carrier frequency and data to modulate a modulator array 200 (whether a vector modulator array or other modulator array) is provided to the corresponding antenna array 400 of coherent-signal extractor subsystems 600-v that is designed to operate at that RF carrier frequency. The transmission of the optical beam pairs 114a, 114b of the TOPS modules 1000 and data may be done in the same manner as described with respect to FIG. 10C. In addition, as shown in FIG. 10E, several optical beam pairs 114a, 114b generated by different TOPS modules 1000 and corresponding to different RF carrier frequencies may be transmitted together on the same optical fiber 222c after combining the same with optical combiner 50. Each of these optical beam pairs 114a, 114b of corresponding to different RF carrier frequencies may be extracted by the coherent-signal extractor subsystem 600-v by the WDM demultiplexer 225 and then split into several optical beam pairs 114a, 114b by a corresponding beam splitter 50 and provided as plural optical beam pairs 114a, 114b to the corresponding modulation array 200. Such transmission and extraction of plural optical beam pairs 114a, 114b of different RF carrier frequencies may be done in a manner as described with respect to FIG. 10D and need not be repeated here.

Each modulation array 200 may thus modulate plural optical beam pairs 114a, 114b with the data provided by the channel encoder and provide plural modulated optical beam pairs 114a, 114b to control and/or drive of each antenna 400 as described elsewhere herein.

Figure 8A:
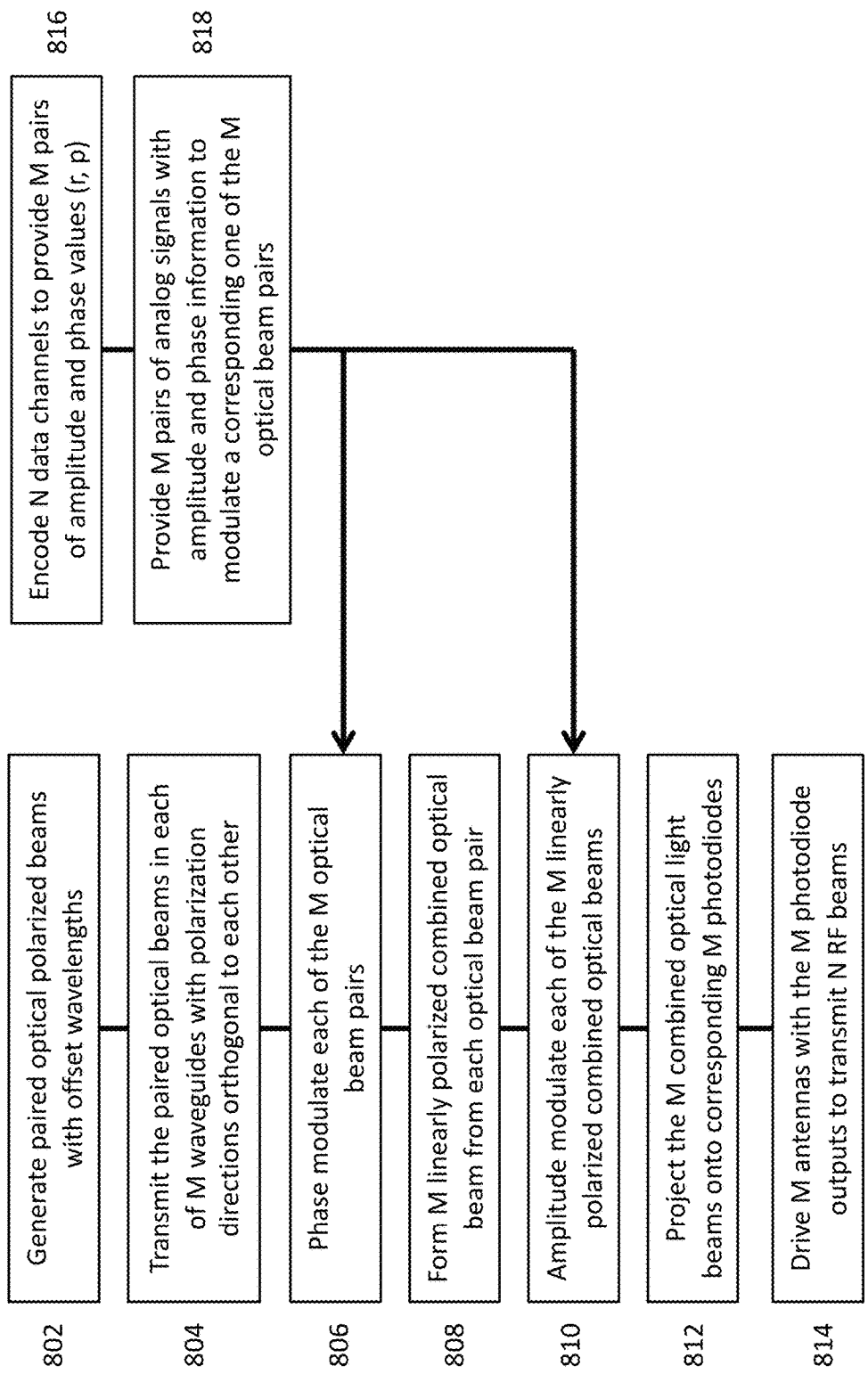

As noted, only one coherent-signal extractor subsystems 600-v is shown in FIG. 10E. However, the embodiment of FIG. 10E may include several coherent-signal extractor subsystems 600-v that are controlled by the same coherent signal generator subsystem 500-v. FIG. 11B also is a representative example of such implementation, where coherent-signal extractor subsystems 600-1, 600-2, 600-3 and 600-4 may be implemented by the coherent-signal extractor subsystems 600-v of FIG. 10E and the coherent signal generator subsystem 500 may be implemented by the coherent signal generator subsystem 500-v of FIG. 10E. Details of exemplary operation and configurations of the system of FIG. 11B otherwise may be the same as described elsewhere herein FIG. 8A illustrates method of operation of an antenna transmitter that may be applied to apparatus embodiments described herein with respect to FIGS. 1, 6 and 7 (as well as the systems described herein implementing the same or similar modulations of FIGS. 1, 6 and 7). FIGS. 8B and 8C illustrates methods of operation of an antenna transmitter that may be applied to the apparatus embodiment of FIG. 9B (as well as the systems described herein implementing the same or similar modulations of FIG. 9B). Reference may be made to those apparatus embodiments for further details and options regarding steps that may be performed in connection with the methods described with respect to FIGS. 8A, 8B and 8C. In step 802, paired optical beams are generated, the optical beams each having a spectral line frequency and having wavelengths offset from one another. The paired optical beams may be generated using a TOPS module 1000, as described herein, and may have a wavelength offset determined by the frequency determined by an analog reference signal, such as the RF reference signal of the TOPS described herein. In some examples, the frequency of this analog reference signal may be adjustable to dynamically select the wavelength offset of the paired optical beams. In step S802, plural pairs of such optical beams may be generated by a single TOPS or a plurality of such optical beams may be generated by plural TOPS.

In step 804, M optical beam pairs are transmitted on each of M waveguides, with the polarization directions of the optical beams (of an optical beam pair) orthogonal to each other. Having polarization directions orthogonal to each other allows the optical beams to be transmitted in the waveguide without interfering with one another. Each of the M optical waveguides may be an optical fiber, such as a PM optical fiber. Each of the M optical beam pairs may be formed from the same source (e.g., same TOPS) or may be formed from separate sources (e.g., several TOPS). The frequencies of the 2M optical beams need not be coherent with each other, and thus may be out of phase with each other and have different frequencies from each other. The beat frequencies of the optical beam pairs within a waveguide may have the same frequency and may be in phase with each other.

In alternative step 804' (FIGS. 8B and 8C), 2M optical beams (forming M optical beam pairs) are transmitted on respective 2M waveguides.

In step 806, at least one of the optical beams is phase modulated in an electro-optical phase modulator. The phase modulator may be a conventional lithium-niobate phase modulator, but other optical phase modulators may be used. The phase modulation may be unequally performed or asymmetrically performed on the pair of optical beams so that a phase shift occurs more significantly with respect to one of the optical beams as compared to the other of the optical beams. The phase modulation of may be determined by phase modulation information p provided with an analog electrical signal Fp to the phase modulator. The phase modulation may be performed by without splitting the pair of optical beams from each other.

In alternative step 806' (FIG. 8B), for each pair of the M pairs of optical beams, transmit at least one of the optical beams through an electro-optic phase modulator to allow phase modulation of the same.

In step 806" (FIG. 8C), for each pair of the M pairs of optical beams, transmit at least one of the optical beams through an electro-optic I/Q, or quadrature, modulator to allow I/Q modulation of the same.

In step 808, the polarization direction of the optical beams of each of the M optical beam pairs are projected onto the same axis to allow the optical beams of an optical beam pair to interfere with each other. A polarizer may be used to perform this alignment of the polarization axes of the optical beams. For each of the M pairs of optical beams, a combined optical beam that is linearly polarized is formed that has a beat frequency determined by the difference of the wavelengths of the optical beams of the optical beam pair.

In step 808' (FIGS. 8B and 8C), each of the M pairs of optical beams is combined into a combined beam with their polarization directions aligned. For example, each of the M optical beam pairs are transmitted to a corresponding optical combiner on two corresponding waveguides and output by the optical combiner on a single corresponding waveguide. Each of the resulting combined optical beams may be linearly polarized.

In step 810, the combined optical beam is amplitude modulated by an amplitude modulator. The amplitude modulator may be a Mach-Zehnder push-pull modulator, but other optical amplitude modulators may be used. The amplitude modulation may be determined by amplitude modulation information r provided with an analog electrical signal Fr to the amplitude modulator. Steps 806, 808 and 810 may be performed by a vector modulator for each of the M optical pairs.

In step 812, each of the M modulated combined optical beams are projected onto a corresponding photodetector (which may be a photodiode). In response to the received combined optical beam, each photodiode may generate an electrical signal having an RF frequency corresponding to the beat frequency of the combined optical beams, which is then transmitted to a corresponding antenna of the antenna array, to which the photodetector output is connected.

In step 814, an antenna array transmits on or more RF beams. Each antenna may radiate an electromagnetic wave having a frequency and phase as provided by a corresponding photodetector to which it is connected. The combined RF radiation of the plurality of antennas may form the one or more RF beams. Each RF beam may be formed to converge on at least one targeted user equipment UE. Each RF beam may be modulated through time (based on the phase and amplitude modulation information (r, p) or I/Q) to provide a communication channel (that may include a plurality of sub-channels). Information provided by the communication channel may be decoded by the user equipment. The decoded information may be digitized to its original form and may comprise audio, video and/or data.

Steps 816 and 818 of FIGS. 8A and 8B also provide an example of the generation of analog electrical signals Fr and Fp. In step 816, N data channels are encoded by a matrix X to provide M pairs of amplitude and phase values (r, p), which may be in the form of digital data. Each data channel may be a stream of symbols. The matrix X may comprise N columns of complex vectors, each complex vector $X_n$ defining the amplitude and phase profile for a corresponding RF beam (and the corresponding channel) it forms. Each complex vector $X_n$ may be obtained from channel measurement for one of the corresponding channels each formed by an RF beam.

In step 818, each of the M amplitude and phase value pairs (r, p) is converted from digital to analog, and provided as an analog electrical signal Fr and Fp to modulate a corresponding pair of optical beams.

Steps 816" and 818" of FIG. 8C are analogous to the respective steps 816 and 818 of FIGS. 8A and 8B. In steps 816" and 818", information carried by each of the M complex numbers that form the plurality of modulating signals is encoded in Cartesian coordinates I/Q, i.e. real and imaginary components.

Channel Encoding Example.

In this example, the data inputs are in the form of complex numbers. The real and imaginary parts may represent the I and Q components of an arbitrary modulation scheme. As such, at any given time t, the n-th data input $D_n(t)$ represents a symbol to be transmitted to the n-th UE. The data encoding schemes in the different data inputs need not be the same and may even be fed at different rates as long as the lowest common multiple of the data rates is below the processing-speed capability of the channel-encoding block. Thus, one data input $D_n(t)$ may result in a first encoding scheme (e.g., OOK) for the associated RF beam, while a second data input $D_{n+1}(t)$ may result in a second encoding scheme (e.g., 16 QAM) for the associated RF beam. The n data inputs are organized into a vector $$\begin{pmatrix} D_1 \\ D_2 \\ \vdots \\ D_N \end{pmatrix} = D. \tag{2}$$

Channel encoding performs a linear matrix multiplication $$F = XD, \tag{3}$$

where F is a vector of complex numbers $$F = \begin{pmatrix} F_1 \\ F_2 \\ \vdots \\ F_M \end{pmatrix} \tag{4}$$

whose entries represent the instantaneous modulation (phase and/or amplitude) to be applied to the optical feeds for the respective antennas of the array. Matrix X takes into account channel-state information to yield proper RF beamforming. Thus, the output of the channel-encoding block comprises M pairs of signals, where each pair represents a complex number $F_n$. The representation of the complex numbers may be, for example, in the form of the real and imaginary parts, i.e. Cartesian, or in the form of its absolute value (amplitude) and argument (phase), i.e. polar. The choice of representation depends on the choice of the type of modulator architecture used as described above.

EXAMPLE

Consider a scene with two spatially-separated UE-s and no scattering. Assume further that forming an RF beam with angular frequency $\Omega$ directed at the first UE requires the M antennas to apply phases $$2\pi \frac{d_1}{M}, 2\pi \frac{2d_1}{M}, 2\pi \frac{3d_1}{M}, \ldots, 2\pi \frac{(M-1)d_1}{M}, 0 \tag{5}$$

to the transmitted waves, where $d_1$ is an integer between 1 and M. Note that the phase changes linearly with the position of the antenna in the array, which leads to the formation of a beam directed at a certain angle from the direction normal to the antenna-array plane. Similarly, assume that to direct the RF beam to the second UE requires phases $$2\pi \frac{d_2}{M}, 2\pi \frac{2d_2}{M}, 2\pi \frac{3d_2}{M}, \ldots, 2\pi \frac{(M-1)d_2}{M}, 0 \tag{6}$$

at the respective antennas, where $d_2$ is an integer between 1 and M, and $d_1 \neq d_2$. Note that the last condition of differing $d_1$ and $d_2$ corresponds to spatial separation of the UE-s—the two RF beams point in two different directions.

According to Eq. (2), the two data inputs form a vector $$D = \begin{pmatrix} D_1 \\ D_2 \end{pmatrix}. \tag{7}$$

To satisfy expressions (5) and (6) for phases required to direct the RF beams to the respective UE-s, channel-encoding matrix X takes the following form $$X = \begin{pmatrix} \exp\left(2\pi j \frac{d_1}{M}\right) & \exp\left(2\pi j \frac{d_2}{M}\right) \\ \exp\left(2\pi j \frac{2d_1}{M}\right) & \exp\left(2\pi j \frac{2d_2}{M}\right) \\ \vdots & \vdots \\ \exp\left(2\pi j \frac{Md_1}{M}\right) & \exp\left(2\pi j \frac{Md_2}{M}\right) \end{pmatrix} \tag{8}$$

$$= \begin{pmatrix} \exp\left(2\pi j \frac{d_1}{M}\right) & \exp\left(2\pi j \frac{d_2}{M}\right) \\ \exp\left(2\pi j \frac{2d_1}{M}\right) & \exp\left(2\pi j \frac{2d_2}{M}\right) \\ 1 & 1 \end{pmatrix}.$$

As a result, the complex inputs to the M modulators are $$F = \begin{pmatrix} D_1 \exp\left(2\pi j \frac{d_1}{M}\right) + D_2 \exp\left(2\pi j \frac{d_2}{M}\right) \\ D_1 \exp\left(2\pi j \frac{2d_1}{M}\right) + D_2 \exp\left(2\pi j \frac{2d_2}{M}\right) \\ D_1 + D_2 \end{pmatrix}. \tag{9}$$

The complex numbers of Eq. (9) multiply the RF carrier $\exp(j\Omega t)$ via the interaction in the vector modulators followed by photodiodes coupled to the respective antennas. As a result, the RF wave radiated by the antennas have the following form $$\begin{pmatrix} D_1 \exp\left(j\Omega t + 2\pi j \frac{d_1}{M}\right) + D_2 \exp\left(j\Omega t + 2\pi j \frac{d_2}{M}\right) \\ D_1 \exp\left(j\Omega t + 2\pi j \frac{2d_1}{M}\right) + D_2 \exp\left(j\Omega t + 2\pi j \frac{2d_2}{M}\right) \\ D_1 \exp(j\Omega t) + D_2 \exp(j\Omega t) \end{pmatrix}. \tag{10}$$

Consider an on-off keying (OOK) modulation—the simplest form of amplitude-shift keying modulation. In this case, the data inputs $D_1$ and $D_2$ take one of two values: 0 or 1. If both $D_1$ and $D_2$ are 0, then, according to expression (10), the antennas transmit no wave, and therefore both UE-s receive the bit value of 0. If $D_1=1$ and $D_2=0$, then according to (10), the antennas transmit the following waveforms $$\begin{pmatrix} \exp\left(j\Omega t + 2\pi j \frac{d_1}{M}\right) \\ \exp\left(j\Omega t + 2\pi j \frac{2d_1}{M}\right) \\ \exp(j\Omega t) \end{pmatrix}. \quad (11)$$

Per (5), the antenna array will generate a single beam directed at $UE_1$. In this case, $UE_1$ will receive the bit value of 1 whereas $UE_2$ will receive the bit value of 0 since no RF beam is transmitted in its direction. For $D_1=0$ and $D_2=1$, according to (10), the antennas transmit the following waveforms $$\begin{pmatrix} \exp\left(j\Omega t + 2\pi j \frac{d_2}{M}\right) \\ \exp\left(j\Omega t + 2\pi j \frac{2d_2}{M}\right) \\ \exp(j\Omega t) \end{pmatrix}, \quad (12)$$

which according to (6) yields an RF beam directed at $UE_2$. As a result, $UE_2$ receives the bit value of 1 whereas $UE_1$ receives the bit value of 0 since no RF beam is transmitted in its direction.

When both $D_1$ and $D_2$ are 1, then according to (10), the antennas transmit the following waveforms $$\begin{pmatrix} \exp\left(j\Omega t + 2\pi j \frac{d_1}{M}\right) + \exp\left(j\Omega t + 2\pi j \frac{d_2}{M}\right) \\ \exp\left(j\Omega t + 2\pi j \frac{2d_1}{M}\right) + \exp\left(j\Omega t + 2\pi j \frac{2d_2}{M}\right) \\ \exp(j\Omega t) + \exp(j\Omega t) \end{pmatrix}. \quad (13)$$

which can be written as $$\begin{pmatrix} \exp\left(j\Omega t + 2\pi j \frac{d_1}{M}\right) \\ \exp\left(j\Omega t + 2\pi j \frac{2d_1}{M}\right) \\ \exp(j\Omega t) \end{pmatrix} + \begin{pmatrix} \exp\left(j\Omega t + 2\pi j \frac{d_2}{M}\right) \\ \exp\left(j\Omega t + 2\pi j \frac{2d_2}{M}\right) \\ \exp(j\Omega t) \end{pmatrix}, \quad (14)$$

that is a superposition of two beams, one directed at $UE_1$ per (5), and the other directed at $UE_2$ per (6). As a result, in this case, both UE-s receive the bit value of 1.

As the values of $D_1$ and $D_2$ change in time according to the data streams input to the channel-encoding block, RF beams are formed as explained above. The beam-forming takes place at (at least) the rate the data are transmitted—every cycle of symbols yields an RF wave-form corresponding to the data to be sent. This way, each of the UE-s receives the data stream intended for it and no data intended for the other UE.

When using modulation schemes more sophisticated than OOK, with more than two UE-s, and a more complex scattering environment, the data streams are directed to the corresponding UE-s. For cases where the beams directed at the spatially separated UE-s are not strictly orthogonal, additional processing is beneficial to minimize the interference. In general, spatial diversity should be considered an additional degree of freedom, besides carrier frequency and (orthogonal) data encoding, to encode data streams and provide increased aggregate data throughput to UE-s.

A transmitter to be used in wireless multi-user MIMO has been described above. The system combines the virtues of digital, analog and optical processing to arrive at a solution for scalable, non-blocking, simultaneous transmission to multiple UE-s. The system architecture is independent of the RF carrier frequency, and different frequency bands can be accessed easily and rapidly by tuning the optical source (TOPS). The data channels are established in the digital domain and the RF beam-forming accuracy is only limited by the available resolution of DAC, which can be as high as 16 bits for 2.8 GSPS in off-the-shelf components.

The antenna transmitters described herein may operate and communicate with a wide range of radio frequencies, such as millimeter wave (e.g., about 30 to 300 GHz), microwave (e.g., 1 to 170 GHz), SHF (3 GHz to 30 GHz), UHF (300 MHz to 3 GHz), VHF (30 to 300 MHz), to radio frequencies as low as 300 KHz or even 30 KHz. The invention may also be used with other communication frequencies outside of radio frequencies. Higher frequencies above millimeter wavelength frequencies (e.g., terahertz radiation band between infrared light and millimeter wavelength RF), with a dependence on the ability to convert the beat frequency of the interfering light beams (Beam m) to an electromagnetic wave (e.g., in the detailed embodiments disclosed herein, would depend on the ability of the photo-detector to convert the be beat frequency of Beam m to the appropriate higher frequency and for the antennas 412 to transmit the same). It will be appreciated that while a transmitter array 10 may dynamically change the range of frequencies that may be transmitted, real time alteration of the carrier frequency will be limited by the type of antenna 412 of the antenna array 400 (although, these may be physically replaced with other antennas by a user).

The light beams (114a, 114b) described herein may be visible light or invisible light (e.g., infrared, ultraviolet). Use of other waveguides other than a fiber optics may also be implemented, however widespread availability and ease of use of fiber optics make such waveguides preferable.

Although aspects of embodiments of the present invention has been described, it will be appreciated that the invention may take many forms and is not limited thereto. It will be apparent to those skilled in the art that various substitution, modifications and changes may be made with respect to the disclosed embodiments without departing from the scope and spirit of the invention.

What is claimed is:
1. A transmitter comprising:
a first tunable optical paired source configured to generate a first optical beam of the first tunable optical paired source having a first wavelength of the first tunable optical paired source, and a second optical beam of the first tunable optical paired source having a second wavelength of the first tunable optical paired source;
a first modulator configured to receive the first optical beam of the first tunable optical paired source at a first optical input of the first modulator and to receive the second optical beam of the first tunable optical paired source at a second optical input of the first modulator, further configured to receive a first electrical signal for the first modulator at a first electrical input of the first modulator and to receive a second electrical signal for the first modulator at a second electrical input of the first modulator, additionally configured to output a first modulated optical beam at an output of the first modulator;

a second tunable optical paired source configured to generate a first optical beam of the second tunable optical paired source having a first wavelength of the second tunable optical paired source, and a second optical beam of the second tunable optical paired source having a second wavelength of the second tunable optical paired source;

a second modulator configured to receive the first optical beam of the second tunable optical paired source at a first optical input of the second modulator and to receive the second optical beam of the second tunable optical paired source at a second optical input of the second modulator, further configured to receive a first electrical signal for the second modulator at a first electrical input of the second modulator and to receive a second electrical signal for the second modulator at a second electrical input of the second modulator, additionally configured to output a second modulated optical beam at an output of the second modulator;

a first photodetector configured to receive the first modulated optical beam from the output of the first modulator, further configured to output a first electrical output signal;

a second photodetector configured to receive the second modulated optical beam from the output of the second modulator, further configured to output a second electrical output signal;

a first antenna electrically coupled to receive the first electrical output signal from the first photodetector; and a second antenna electrically coupled to receive the second electrical output signal from the second photodetector.

2. The transmitter of claim 1, further comprising an RF reference configured to synchronize differences between the first and second wavelengths of corresponding ones of the tunable optical paired sources.

3. The transmitter of claim 1, further comprising:

a third modulator configured to receive the first optical beam of the first tunable optical paired source at a first optical input of the third modulator and to receive the second optical beam of the first tunable optical paired source at a second optical input of the third modulator, further configured to receive a first electrical signal for the third modulator at a first electrical input of the third modulator and to receive a second electrical signal for the third modulator at a second electrical input of the third modulator, additionally configured to output a third modulated optical beam at an output of the third modulator; and a fourth modulator configured to receive the first optical beam of the second tunable optical paired source at a first optical input of the fourth modulator and to receive the second optical beam of the second tunable optical paired source at a second optical input of the fourth modulator, further configured to receive a first electrical signal for the fourth modulator at a first electrical input of the fourth modulator and to receive a second electrical signal for the fourth modulator at a second electrical input of the fourth modulator, additionally configured to output a fourth modulated optical beam at an output of the fourth modulator.

4. The transmitter of claim 3, wherein the first photodetector is further configured to receive the third modulated optical beam from the output of the third modulator, and the second photodetector is further configured to receive the fourth modulated optical beam from the output of the fourth modulator.

5. The transmitter of claim 1 further comprising:

a multiplexer with a first optical input of the multiplexer, a second optical input of the multiplexer, and an optical output of the multiplexer, configured to receive the first modulated optical beam at the first optical input of the multiplexer, and to receive the second modulated optical beam at the second optical input of the multiplexer, further configured to output a combined optical beam containing at least a portion of the first modulated optical beam and at least a portion of the second modulated optical beam at the optical output of the multiplexer;

a demultiplexer with an optical input of the demultiplexer, a first optical output of the demultiplexer and a second optical output of the demultiplexer, configured to receive a combined optical beam at the optical input of the demultiplexer, further configured to separate the combined optical beam into the first modulated optical beam and the second modulated optical beam, further configured to output the first modulated optical beam at the first optical output of the demultiplexer and to output the second modulated optical beam at the second optical output of the demultiplexer; and an optical waveguide connecting the optical output of the multiplexer to the optical input of the demultiplexer;

wherein the demultiplexer is configured to couple the first optical output of the demultiplexer to the first photodetector, and to couple the second optical output of the demultiplexer to the second photodetector, whereby the first photodetector receives the first modulated optical beam and the second photodetector receives the second modulated optical beam.

6. The transmitter of claim 1 further comprising:

a third tunable optical paired source configured to generate a first optical beam of the third tunable optical paired source having a first wavelength of the third tunable optical paired source, and a second optical beam of the third tunable optical paired source having a second wavelength of the third tunable optical paired source;

a third modulator configured to receive the first optical beam of the third tunable optical paired source at a first optical input of the third modulator and to receive the second optical beam of the third tunable optical paired source at a second optical input of the third modulator, further configured to receive a first electrical signal for the third modulator at a first electrical input of the third modulator and to receive a second electrical signal for the third modulator at a second electrical input of the third modulator, additionally configured to output a third modulated optical beam at an output of the third modulator;

a fourth tunable optical paired source configured to generate a first optical beam of the fourth tunable optical paired source having a first wavelength of the fourth tunable optical paired source, and a second optical beam of the fourth tunable optical paired source having a second wavelength of the fourth tunable optical paired source; and a fourth modulator configured to receive the first optical beam of the fourth tunable optical paired source at a first optical input of the fourth modulator and to receive the second optical beam of the fourth tunable optical paired source at a second optical input of the fourth modulator, further configured to receive a first electrical signal for the fourth modulator at a first electrical input of the fourth modulator and to receive a second electrical signal for the fourth modulator at a second electrical input of the fourth modulator, additionally configured to output a fourth modulated optical beam at an output of the fourth modulator.

7. The transmitter of claim 6, further comprising:
a first multiplexer with a first optical input of the first multiplexer, a second optical input of the first multiplexer, and an optical output of the first multiplexer, configured to receive the first modulated optical beam at the first optical input of the first multiplexer, and to receive the second modulated optical beam at the second optical input of the first multiplexer, further configured to output a first combined optical beam containing at least a portion of the first modulated optical beam and at least a portion of the second modulated optical beam at the optical output of the first multiplexer;
a first demultiplexer with an optical input of the first demultiplexer, a first optical output of the first demultiplexer and a second optical output of the first demultiplexer, configured to receive a first combined optical beam at the optical input of the first demultiplexer, further configured to separate the first combined optical beam into the first modulated optical beam and the second modulated optical beam, further configured to output the first modulated optical beam at the first optical output of the first demultiplexer and to output the second modulated optical beam at the second output of the first demultiplexer;
a first optical waveguide connecting the optical output of the first multiplexer to the optical input of the first demultiplexer;
a second multiplexer with a first optical input of the second multiplexer, a second optical input of the second multiplexer, and an optical output of the second multiplexer, configured to receive the third modulated optical beam at the first optical input of the second multiplexer, and to receive the fourth modulated optical beam at the second optical input of the second multiplexer, further configured to output a second combined optical beam containing at least a portion of the third modulated optical beam and at least a portion of the fourth modulated optical beam at the optical output of the second multiplexer;
a second demultiplexer with an optical input of the second demultiplexer, a first optical output of the second demultiplexer and a second optical output of the second demultiplexer, configured to receive a second combined optical beam at the optical input of the second demultiplexer, further configured to separate the second combined optical beam into the third modulated optical beam and the fourth modulated optical beam, further configured to output the third modulated optical beam at the first optical output of the second demultiplexer and to output the fourth modulated optical beam at the second optical output of the second demultiplexer;
a second optical waveguide connecting the optical output of the second multiplexer to the optical input of the second demultiplexer
a first photodetector of a second array configured to output a third electrical output signal;
a second photodetector of the second array configured to output a fourth electrical output signal;
a first antenna of the second array electrically coupled to receive the third electrical output signal from the first photodetector of the second array; and
a second antenna of the second array electrically coupled to receive the fourth electrical output signal from the second photodetector of the second array,
the second demultiplexer configured to couple the first optical output of the second demultiplexer to the first photodetector of the second array, and to couple the second optical output of the second demultiplexer to the second photodetector of the second array.

8. The transmitter of claim 7, further comprising an RF reference configured to synchronize differences between the first and second wavelengths of corresponding ones of the tunable optical paired sources.

9. The transmitter of claim 6, further comprising:
a multiplexer with a first optical input of the multiplexer, a second optical input of the multiplexer, a third optical input of the multiplexer, a fourth optical input of the multiplexer, and an optical output of the multiplexer, configured to receive the first, second, third and fourth modulated optical beams respectively at the first, second, third and fourth optical inputs of the multiplexer, further configured to output a combined optical beam containing at least portions of the first, second, third and fourth modulated optical beams at the optical output of the multiplexer;
a demultiplexer with an optical input of the demultiplexer, a first optical output of the demultiplexer, a second optical output of the demultiplexer, a third optical output of the demultiplexer and a fourth optical output of the demultiplexer, configured to receive the combined optical beam at the optical input of the demultiplexer, further configured to separate the combined optical beam into the first, second, third and fourth modulated optical beams, and further configured to output at least portions of the first, second, third and fourth modulated optical beams respectively at the first, second, third and fourth optical outputs of the demultiplexer;
an optical waveguide connecting the optical output of the multiplexer to the optical input of the demultiplexer;
a first photodetector of a second array configured to output a third electrical output signal;
a second photodetector of the second array configured to output a fourth electrical output signal;
a first antenna of the second array electrically coupled to receive the third electrical output signal from the first photodetector of the second array; and
a second antenna of the second array electrically coupled to receive the fourth electrical output signal from the second photodetector of the second array,
wherein the demultiplexer is configured to couple the first optical output of the demultiplexer to the first photodetector, to couple the second optical output of the demultiplexer to the second photodetector, to couple the third optical output of the demultiplexer to the first photodetector of the second array, and to couple the fourth optical output of the demultiplexer to the second photodetector of the second array, whereby the first photodetector receives the first modulated optical beam, the second photodetector receives the second modulated optical beam, the first photodetector of the second array receives the third modulated optical beam, and the second photodetector of the second array receives the fourth modulated optical beam.

10. The transmitter of claim 6, further comprising:
a multiplexer with a first optical input of the multiplexer, a second optical input of the multiplexer, a third optical input of the multiplexer, a fourth optical input of the multiplexer, and an optical output of the multiplexer, configured to receive the first optical beam of the first tunable optical paired source at the first optical input of the multiplexer, the second optical beam of the first tunable optical source at the second optical input of the multiplexer, the first optical beam of the second tunable optical source at the third optical input of the multiplexer, and the second optical beam of the second tunable optical source at the fourth optical input of the multiplexer, and further configured to output a combined optical beam containing at least portions of the optical beams received by the multiplexer at the optical output of the multiplexer;
a demultiplexer with an optical input of the demultiplexer, a first optical output of the demultiplexer, a second optical output of the demultiplexer, a third optical output of the demultiplexer and a fourth optical output of the demultiplexer, configured to receive the combined optical beam at the optical input of the demultiplexer, and further configured to separate the combined optical beam into at least portions of the optical beams received by the multiplexer from the tunable optical paired sources; and
an optical waveguide connecting the optical output of the multiplexer to the optical input of the demultiplexer,
wherein the demultiplexer is configured to couple the first optical output of the demultiplexer to the first optical input of the first modulator, to couple the second optical output of the demultiplexer to the second optical input of the first modulator, to couple the third optical output of the demultiplexer to the first optical input of the second modulator, and to couple the fourth optical output of the demultiplexer to the second optical input of the second modulator,
whereby the respective modulators receive respective beams of the respective tunable optical paired sources.

11. The transmitter of claim 1, wherein the first modulator and the second modulator each comprise:
a phase modulator with an optical input of the phase modulator, an optical output of the phase modulator, and an electrical input of the phase modulator,
a combiner with a first optical input of the combiner, a second optical input of the combiner, and an optical output of the combiner, wherein the first optical input of the combiner is coupled to the optical output of the phase modulator,
configured to have the optical input of the phase modulator as the first optical input, and to have the second optical input of the combiner as the second optical input,
further configured to have the optical output of the combiner as the output, and
further configured to have the electrical input of the phase modulator as the first electrical input.

12. The transmitter of claim 1, wherein each of the first and second modulators comprise:
an amplitude modulator with an optical input of the amplitude modulator, an optical output of the amplitude modulator, and an electrical input of the amplitude modulator,
a combiner with a first optical input of the combiner, a second optical input of the combiner, and an optical output of the combiner, wherein the optical output of the combiner is coupled to the optical input of the amplitude modulator,
configured to have the first optical input of the combiner as the first optical input,
further configured to have the second optical input of the combiner as the second optical input,
further configured to have the optical output of the amplitude modulator as the optical output, and
further configured to have the electrical input of the amplitude modulator as the first electrical input.

13. The transmitter of claim 1, wherein each of the first and second modulators comprise:
a phase modulator with an optical input of the phase modulator, an optical output of the phase modulator, and an electrical input of the phase modulator,
an amplitude modulator with an optical input of the amplitude modulator, optical output of the amplitude modulator, and an electrical input of the amplitude modulator,
a combiner with a first optical input of the combiner, a second optical input of the combiner, and an optical output of the combiner, wherein the first optical input of the combiner is coupled to the optical output of the phase modulator, and wherein the optical output of the combiner is coupled to the optical input of the amplitude modulator,
configured to have the optical input of the phase modulator as the first optical input, and to have the second optical input of the combiner as the second optical input,
further configured to have the second optical input of the combiner as the second optical input,
further configured to have the optical output of the amplitude modulator as the optical output,
further configured to have the electrical input of the phase modulator as the first electrical input, and
further configured to have the electrical input of the amplitude modulator as the second electrical input.

14. The transmitter of claim 1, wherein each of the first and second modulators comprise:
an I/Q modulator with an optical input of the I/Q modulator, an optical output of the I/Q modulator, a first electrical input of the I/Q modulator, and a second electrical input of the I/Q modulator,
a combiner with a first optical input of the combiner, a second optical input of the combiner, and an optical output of the combiner, wherein the first optical input of the combiner is coupled to the optical output of the I/Q modulator,
configured to have the optical input of the I/Q modulator as the first optical input, and to have the second optical input of the combiner as the second optical input,
further configured to have the optical output of the combiner as the output,
further configured to have the first electrical input of the I/Q modulator as the first electrical input,
further configured to have the second electrical input of the I/Q modulator as the second electrical input.

15. The transmitter of claim 1, wherein each of the first and second modulators comprises a vector modulator having an optical input of the vector modulator, an optical output of the vector modulator, a first electrical input of the vector modulator and a second electrical input of the vector modulator, the vector modulator comprising:
- an electro-optical phase modulator having an input to receive a combined orthogonally polarized optical beam, the electro-optical phase modulator configured to phase modulate the combined orthogonally polarized optical beam in response to a first analog electrical signal coupled to the first electrical input of the vector modulator;
- a polarizer configured to receive the phase modulated combined orthogonally polarized optical beam and to project the first optical beam and the second optical beam components of the combined orthogonally polarized optical beam onto the same axis to form a combined linearly polarized optical beam; and
- an electro-optical amplitude modulator having an input to receive the combined linearly polarized optical beam, the electro-optical amplitude modulator configured to amplitude modulate the combined linearly polarized optical beam in response to a second analog electrical signal coupled to the second electrical input of the vector modulator,
- wherein an optical beam coupled to the first optical input couples to a first polarization of the combined orthogonally polarized optical beam, and
- wherein an optical beam coupled to the second optical input couples to a second polarization of the combined orthogonally polarized optical beam, and
- wherein the first electrical input of the vector modulator is the first electrical input, and
- wherein the second electrical input of the vector modulator is the second electrical input, and
- wherein the optical output of the vector modulator is the output.

16. The transmitter of claims 5, wherein the multiplexer is a wavelength division multiplexer and the demultiplexer is a wavelength division demultiplexer.

17. The transmitter of claim 5, wherein the multiplexer is a hybrid polarization/wavelength division multiplexer and the demultiplexer is a hybrid polarization/wavelength division demultiplexer.

18. A transmitter comprising:
- a first tunable optical paired source configured to generate a first pair of optical beams, the first pair of optical beams comprising a first wavelength optical beam and a second wavelength optical beam;
- a first modulator having an optical input optically connected to the first tunable optical paired source to receive the first pair of optical beams of the first tunable optical paired source and having an electrical input to receive a first electrical signal, the first modulator configured to modulate at least one of the first wavelength optical beam and the second wavelength optical beam in response to the first electrical signal, and to provide a first modulated optical beam in response thereto;
- a second tunable optical paired source configured to generate a second pair of optical beams, the second pair of optical beams comprising a third wavelength optical beam and a fourth wavelength optical beam;
- a second modulator having an optical input optically connected to the second tunable optical paired source to receive the second pair of optical beams of the second tunable optical paired source and having an electrical input to receive a second electrical signal, the second modulator configured to modulate at least one of the third wavelength optical beam and the fourth wavelength optical beam in response to the second electrical signal, and to output a second modulated optical beam in response thereto;
- a first photodetector configured to receive the first modulated optical beam output from the first modulator and to output a first electrical output signal generated in response to the first modulated optical beam;
- a second photodetector configured to receive the second modulated optical beam output from the second modulator and to output a second electrical output signal generated in response to the second modulated optical beam;
- a first antenna configured to output a first electromagnetic signal in response to the first electrical output signal from the first photodetector;
- a second antenna configured to output a second electromagnetic signal in response to the second electrical output signal from the second photodetector: and
- an RF reference configured to provide an RF reference signal to the first and second tunable optical paired sources,
- wherein the first tunable optical paired source is responsive to the RF reference signal to generate a first wavelength offset between the first pair of optical beams, and
- wherein the second tunable optical paired source is responsive to the RF reference signal to generate the first wavelength offset between the second pair of optical beams.

19. A method for transmitting information, comprising:
- generating M paired optical polarized beams with offset wavelengths, where M is a positive integer greater than one;
- transmitting the M paired optical polarized beams to M modulators, each modulator configured to receive a respective pair of the optical polarized beams;
- modulating a relative phase between the optical polarized beams forming the respective pair of optical polarized beams in each of the M paired optical polarized beams;
- modulating an amplitude of at least one of the optical polarized beams forming the respective pair of optical polarized beams in each of the M paired optical polarized beams;
- combining each pair of the M paired optical polarized beams, with aligned polarizations, into a corresponding combined optical beam to produce M combined modulated optical beams;
- projecting each of the M combined modulated optical beams onto a corresponding one of M photodetectors; and
- driving M antennas with corresponding electrical outputs of the M photodetectors.

20. A method for transmitting information, comprising:
- generating a paired optical polarized beam with offset wavelength, the paired optical polarized beam comprising a first optical beam with a first polarization and a second optical beam with a second polarization orthogonal to the first polarization;
- splitting the paired optical polarized beam into a first paired optical polarized beam and a second paired optical polarized beam;
- transmitting the first paired optical polarized beam to a first array and the second paired optical polarized beam to a second array, the first array comprising a first plurality of modulators, a corresponding first plurality of photodetectors, and a corresponding first plurality of antennas, the second array comprising a second plurality of modulators, a corresponding second plurality of photodetectors, and a corresponding plurality of antennas;

splitting the first paired optical polarized beam into a first plurality of paired optical polarized beam, and splitting the second paired optical polarized beam into a second plurality of paired optical polarized beams;

modulating a relative phase between optical polarized component beams forming a respective one of the first plurality of paired optical polarized beams in each of the first plurality of paired optical polarized beams;

modulating an amplitude of at least one of the optical polarized component beams forming a respective one of the first plurality of paired optical polarized beams in each of the first plurality of paired optical polarized beams;

combining each pair of the first plurality of paired optical polarized beams, with aligned polarizations, into a corresponding combined optical beam to produce a first plurality of combined modulated optical beams;

projecting each of the first plurality of combined modulated optical beams onto a corresponding one of the first plurality of photodetectors;

driving the first plurality of antennas with corresponding electrical outputs of the first plurality of photodetectors;

modulating a relative phase between optical polarized component beams forming a respective one of the second plurality of paired optical polarized beams in each of the second plurality of paired optical polarized beams;

modulating an amplitude of at least one of the optical polarized component beams forming a respective one of the second plurality of paired optical polarized beams in each of the second plurality of paired optical polarized beams;

combining each pair of the second plurality of paired optical polarized beams, with aligned polarizations, into a corresponding combined optical beam to produce a second plurality of combined modulated optical beams;

projecting each of the second plurality of combined modulated optical beams onto a corresponding one of the second plurality of photodetectors; and driving the second plurality of antennas with corresponding electrical outputs of the second plurality of photodetectors.

* * * * *